United States Patent
Ramatchandirane et al.

(10) Patent No.: US 9,603,019 B1
(45) Date of Patent: Mar. 21, 2017

(54) SECURE AND ANONYMIZED AUTHENTICATION

(71) Applicant: Confia Systems, Inc., Mountain View, CA (US)

(72) Inventors: Nadaradjane Ramatchandirane, Mountain View, CA (US); Vandana Upadhyay, Mountain View, CA (US)

(73) Assignee: Confia Systems, Inc., Mountain View, CA (US)

( * ) Notice: Subject to any disclaimer, the term of this patent is extended or adjusted under 35 U.S.C. 154(b) by 0 days.

(21) Appl. No.: 14/920,137

(22) Filed: Oct. 22, 2015

Related U.S. Application Data

(63) Continuation-in-part of application No. 14/295,516, filed on Jun. 4, 2014.
(Continued)

(51) Int. Cl.
*G06Q 20/00* (2012.01)
*H04W 12/06* (2009.01)
(Continued)

(52) U.S. Cl.
CPC ........ *H04W 12/06* (2013.01); *G06F 21/6254* (2013.01); *H04L 63/08* (2013.01); *H04W 12/02* (2013.01)

(58) Field of Classification Search
CPC ......... G08C 19/00; G08C 17/02; H04M 1/00; G06Q 10/087; G06Q 30/02
(Continued)

(56) References Cited

U.S. PATENT DOCUMENTS 6,175,921 B1 1/2001 Rosen
6,223,291 B1 4/2001 Puhl et al.
(Continued)

FOREIGN PATENT DOCUMENTS

EP 1 874 014 1/2008
WO 01/39072 5/2001
(Continued)

OTHER PUBLICATIONS

'Byndl' [online]. "How It Works," 2014, [Retrieved on May 8, 2014]. Retrieved from the Internet: httn://www.byndl.com/how_it_works.html, 1 page.
(Continued)

*Primary Examiner* — Rokib Masud
(74) *Attorney, Agent, or Firm* — McDonnell Boehnen Hulbert & Berghoff LLP

(57) ABSTRACT

An embodiment may involve receiving, by a computing system, a message from a wireless service provider system. The computing system may include one or more computing devices located, e.g., in the trusted cloud. The message may contain a service-provider-based identity of a client device, an indication that the service-provider-based identity has been authenticated by the wireless service provider, and a code that the client device obtained from a remote machine proximate to the client device. The computing system may generate an anonymized identity of the client device based on the service-provider-based identity. The computing system may verify that a task associated with the code is within the authorized capabilities of the anonymized identity. Possibly based on the code (and perhaps other information as well), the computing system may transmit an instruction to the remote machine. The instruction may direct the remote machine to perform the task.

18 Claims, 27 Drawing Sheets

Related U.S. Application Data

(60) Provisional application No. 61/971,997, filed on Mar. 28, 2014.

(51) Int. Cl.
  *H04W 12/02* (2009.01)
  *H04L 29/06* (2006.01)
  *G06F 21/62* (2013.01)

(58) Field of Classification Search
  USPC .............................. 455/556; 705/16, 18, 39
  See application file for complete search history.

(56) References Cited

U.S. PATENT DOCUMENTS

| | | | |
|---|---|---|---|
| 6,584,309 B1* | 6/2003 | Whigham | G06Q 10/087 455/407 |
| 6,782,080 B2 | 8/2004 | Leivo et al. | |
| 7,203,657 B1 | 4/2007 | Noam | |
| 7,213,742 B1 | 5/2007 | Birch et al. | |
| 7,353,208 B1 | 4/2008 | Stambaugh | |
| 7,458,510 B1 | 12/2008 | Zhou | |
| 7,693,799 B2 | 4/2010 | Park | |
| 7,770,786 B1 | 8/2010 | Birch et al. | |
| 8,205,240 B2 | 6/2012 | Ansari et al. | |
| 8,259,175 B2 | 9/2012 | Bobbitt et al. | |
| 8,280,351 B1 | 10/2012 | Ahmed et al. | |
| 8,332,323 B2 | 12/2012 | Stals et al. | |
| 8,380,177 B2 | 2/2013 | Laracey | |
| 8,490,868 B1 | 7/2013 | Kropf et al. | |
| 8,548,908 B2 | 10/2013 | Friedman | |
| 8,548,912 B2 | 10/2013 | Cincera | |
| 8,632,000 B2 | 1/2014 | Laracey | |
| 8,645,273 B2 | 2/2014 | Antao et al. | |
| 8,738,177 B2 | 5/2014 | Van Ooyen et al. | |
| 2002/0052754 A1 | 5/2002 | Joyce et al. | |
| 2002/0128925 A1 | 9/2002 | Angeles | |
| 2002/0147658 A1* | 10/2002 | Kwan | G06Q 20/04 705/16 |
| 2002/0147913 A1 | 10/2002 | Lun Yip | |
| 2003/0072027 A1 | 4/2003 | Haines et al. | |
| 2003/0126076 A1 | 7/2003 | Kwok et al. | |
| 2004/0006713 A1 | 1/2004 | Minemura | |
| 2004/0059925 A1 | 3/2004 | Benhammou et al. | |
| 2004/0098625 A1* | 5/2004 | Lagadec | G06Q 30/02 726/4 |
| 2005/0102233 A1* | 5/2005 | Park | G06Q 20/16 705/44 |
| 2005/0108158 A1* | 5/2005 | Prisant | G06Q 20/102 705/40 |
| 2005/0149740 A1 | 7/2005 | Kotzin et al. | |
| 2006/0020540 A1 | 1/2006 | Cramer | |
| 2006/0100966 A1 | 5/2006 | Park | |
| 2006/0155855 A1 | 7/2006 | Hamai | |
| 2006/0174018 A1 | 8/2006 | Zhu et al. | |
| 2007/0079115 A1 | 4/2007 | Kresina | |
| 2007/0255662 A1 | 11/2007 | Tumminaro | |
| 2008/0004894 A1 | 1/2008 | Son et al. | |
| 2008/0052091 A1 | 2/2008 | Vawter | |
| 2008/0108322 A1 | 5/2008 | Upp | |
| 2008/0154735 A1 | 6/2008 | Carlson | |
| 2008/0255947 A1 | 10/2008 | Friedman | |
| 2009/0055261 A1 | 2/2009 | Yeh et al. | |
| 2009/0055319 A1 | 2/2009 | Raheman | |
| 2009/0106548 A1 | 4/2009 | Arditti et al. | |
| 2009/0144194 A1 | 6/2009 | Dickelman | |
| 2009/0259534 A1 | 10/2009 | Utter et al. | |
| 2009/0306819 A1 | 12/2009 | Insolia et al. | |
| 2010/0009681 A1 | 1/2010 | Schneyer et al. | |
| 2010/0145819 A1 | 6/2010 | Park | |
| 2011/0086668 A1* | 4/2011 | Patel | G08C 17/02 455/556.1 |
| 2011/0188701 A1 | 8/2011 | Bobbitt et al. | |
| 2011/0251910 A1 | 10/2011 | Dimmick | |
| 2011/0276803 A1 | 11/2011 | Bender et al. | |
| 2012/0029691 A1 | 2/2012 | Mockus et al. | |
| 2012/0089839 A1 | 4/2012 | Qiu et al. | |
| 2012/0162538 A1 | 6/2012 | Dixon et al. | |
| 2012/0290415 A1 | 11/2012 | Itwaru | |
| 2012/0293661 A1 | 11/2012 | Bobbitt et al. | |
| 2013/0054395 A1 | 2/2013 | Cyr et al. | |
| 2013/0091059 A1 | 4/2013 | Stals et al. | |
| 2013/0124396 A1 | 5/2013 | Loff | |
| 2013/0124413 A1 | 5/2013 | Itwaru | |
| 2013/0132217 A1 | 5/2013 | Yahn et al. | |
| 2013/0238455 A1 | 9/2013 | Laracey | |
| 2013/0246203 A1 | 9/2013 | Laracey | |
| 2013/0311313 A1 | 11/2013 | Laracey | |
| 2013/0317928 A1 | 11/2013 | Laracey | |
| 2013/0346299 A1 | 12/2013 | Grinberg et al. | |
| 2014/0032412 A1 | 1/2014 | Park et al. | |
| 2014/0067677 A1 | 3/2014 | Ali et al. | |
| 2014/0201084 A1 | 7/2014 | Dagenais et al. | |
| 2014/0214670 A1 | 7/2014 | McKenna | |
| 2015/0222621 A1 | 8/2015 | Baum et al. | |
| 2015/0350196 A1 | 12/2015 | Toyonaga et al. | |

FOREIGN PATENT DOCUMENTS

| | | |
|---|---|---|
| WO | 03/023644 | 3/2003 |
| WO | 2004/114168 | 12/2004 |
| WO | 2008/127967 | 10/2008 |
| WO | 2011/092044 | 8/2011 |
| WO | 2012/151684 | 11/2012 |
| WO | 2012151660 | 11/2012 |
| WO | 2013/078083 | 5/2013 |
| WO | 2013/155627 | 10/2013 |

OTHER PUBLICATIONS

'Flashiz' [online]. "The universal mobile payments," 2014, [Retrieved on May 8, 2014]. Retrieved from the Internet: http://www.flashiz.com/faq/, 8 pages.

'Shopkick' [online]. "What the press is saying," 2014, [Retrieved on May 8, 2014]. Retrieved from the Internet: http://www.shopkick.com/press, 2 pages.

'South China Morning Post, Companies' [online]. "Tencent, Alibaba open mobile payments battle via vending machines," Oct. 9, 2013. [Retrieved on May 8, 2014]. Retrieved from the Internet: http://www.scmp.com/business/companies/article/1327536/tencent-alibaba-open-mobile-pa, 4 pages.

TechinAsia [online]. "Ubox App+Vending Machines=Mobile Payments for Drinks and Snacks in China," Sep. 6, 2011. [Retrieved on May 8, 2014]. Retrieved from the Internet: URL: http://www.tchinasia.com/ubox-app-vending-machines/. 4 pages.

'Vimeo' [online]. "Flashiz—Restaurant ES," 2014, [Retrieved on May 8, 2014]. Retrieved from the Internet: http://vimeo.com/75209068, 2 pages.

'YouTube' [online]. "Demo—Square Card Reader from Squareup.com," Oct. 27, 2010, [Retrieved on May 8, 2014]. Retrieved from the Internet: http://youtube.com/watch?v-cCMdtfnpolg, 3 pages.

YouTube [online]. "Shopkick—Get Treated Special Again While You Shop," Dec. 20, 2011, [Retrieved on May 8, 2014]. Retrieved from the Internet: http://www.youtube.com/watch?v-2uixneqbqkl, 3 pages.

Lewis, Ira "Logistics and Electronic Commerce: An Interorganizational Systems Perspective," Transportation J., 2001, pp. 5-13, vol. 40, No. 4.

Fomichov et al., "Cognitonics as a new science and its significance for informatics and information society," Informatica, 2006, pp. 387-398, vol. 30.

The Independent [online]. "Pay for vending machine snacks using cell phone," Sep. 13, 2011, [Retrievd on May 8, 2014]. Retrieved from the internet: URL:http://www.independent.co.uk/life-style/pay-for-vending-machine-snacks-using-cell-phone-, 8 pages.

Office Action mailed on Jul. 28, 2014, issued in connection with U.S. Appl. No. 14/295,516, filed Jun. 4, 2014, 10 pages.

(56) References Cited

OTHER PUBLICATIONS

Office Action mailed on Mar. 1, 2016, issued in connection with U.S. Appl. No. 14/295,516, filed Jun. 4, 2014, 11 pages.
Final Office Action mailed on Feb. 5, 2015, issued in connection with U.S. Appl. No. 14/295,516, filed Feb. 5, 2015, 15 pages.
Office Action mailed on Dec. 10, 2015, issued in connection with U.S. Appl. No. 14/852,284, filed Sep. 11, 2015, 25 pages.

\* cited by examiner

2200

2202 Receive a transaction request initiated by a device associated with the consumer, the transaction request being received at a computing system having a prior registration of the consumer and a prior registration of a product or service provider associated with the engaged machine, the transaction request comprising (i) information sufficient for the computing system to identify the consumer from among all registered consumers, (ii) information sufficient for the computing system to identify the product or service provider associated with the engaged machine from among all registered product or service providers, and (iii) information obtained from the machine that is sufficient for the computing system to identify a proposed transaction between the consumer and the product or service provider

2204 Use the received consumer identifying information and the received product or service provider information to identify the parties to the proposed transaction from among all registered consumers and all registered product or service providers

2206 Initiate, by the computing system and on behalf of the registered consumer that is a party to the proposed transaction, an authorization process for the proposed transaction, and, in response, receive an authorization decision result, wherein the authorization process for the proposed transaction is performed without further communication between the computing system and the device associated with the consumer

2208 If the authorization decision result indicates that the proposed transaction is authorized, transmit an authorization communication from the computing system that authorizes the proposed transaction to be fulfilled

FIG. 22

SECURE AND ANONYMIZED AUTHENTICATION

CROSS-REFERENCE TO RELATED APPLICATIONS

This application is a continuation-in-part of, and claims priority to, U.S. patent application Ser. No. 14/295,516, filed Jun. 4, 2014. U.S. patent application Ser. No. 14/295,516 claims priority to U.S. Provisional Application No. 61/971,997, filed on Mar. 28, 2014. These prior applications are considered part of and are incorporated by reference in their entirety herein.

BACKGROUND

Recent years have seen explosive growth of network-connected devices. Once limited to just personal computers and servers, now network connectivity is supported by doors and door locks, digital signage, network-enabled kiosks (e.g., parking meters, vending machines), and so on. Many of these devices interact with a user by way of the user's client device (e.g., a smartphone) so that the devices can perform tasks on behalf of the user. Given that billions of low-cost network-connected devices are expected to be deployed in the future, it is desirable to be able to provide secure and private mechanisms with which a client device can interact with these devices.

SUMMARY

Embodiments described herein can be used to transform machines associated with the Internet of things (IOT) to enable secure access control, authorization, operation, control, monitoring and/or transactions. For example, users can conduct transactions with connected machines, e.g., enabling the machines to become transaction platforms. The transactions, for example, can be completed without the users having to specify personally identifiable information (PII). Instead, transactions can occur in an IOT trusted cloud (or "trusted cloud") that provides a communication link from client devices of users who have previously provided information needed to complete the transactions to the connected machines.

Machines, including IOT machines, that can be used in transactions described herein can include any device capable of presenting, providing and/or dispensing information, products, or services in association with a user transaction. A machine may display information for a product or service, or a machine may provide the product or service. Machines are user-facing devices that are the initiating point for users to complete transactions within the Internet of things. IOT machines can be connected using a network, e.g., that includes the Internet and can also be connected to other networks, e.g., wide area networks (WANs), local area networks (LANs), and/or other types of networks. For example, a parking meter might not be connected directly to the Internet, but it may be connected to a control station using a LAN, and/or to a network of parking meters connected with a WAN. In some cases, a WAN or LAN that in communication with the parking meter may be connected to the trusted cloud using the Internet. In addition to parking meters, connected devices (or IOT machines or IOT devices) can include, for example, vending machines, digital signage devices, connected cars, building automation systems, and other machines or devices that can be used to initiate and/or complete an IOT transaction.

A variety of user devices, including mobile devices such as smartphones and tablets, can be used to convey/send/communicate a request during a transaction. A user device can be, for example, a mobile phone, a smartphone, a tablet, a wearable device or a smart watch. User devices are directly operated by the user and can communicate with the Internet via a connection, e.g., cellular/wireless, Wifi, Bluetooth®, near-field communication (NFC), radio-frequency identification (RFID), or some other proximity networks. Other wireless techniques can include, for example, BLE, audio, picture, and video. While user devices used in IOT transactions are typically mobile devices, non-mobile devices can also be used.

Users can include consumers, technicians, attendants, students or anyone or anything else capable of initiating a transaction involving products or services that involves IOT machines. In some implementations, for transactions to occur, users can register with the trusted cloud, including providing user credentials, payment information (e.g., for payment transactions) and user preferences that identify how and when transactions are to be allowed. Connected machines can also be registered, e.g., by an entity that owns or operates the machines. For example, by registering, the connected machines can be set up to perform transactions with users who are also registered. The owner-operators of one or more IOT machines, can also register an association with the IOT machines that they own/operate.

Transactions can include user requests, covering a variety of user engagement situations such as information requests, action requests, access requests, registration requests, and other types of transactions. These transactions can include, for example, automated retail machines such as vending machines, machines that deliver tickets for movies, transit, etc., parking meters, cafeterias, or connected vehicles. Other automated retail machines may include unattended self-service devices such as kiosks, electric vehicle (EV) charging stations, vehicle rental stations or devices (e.g., bike share or car share programs) automated beverage fountains (e.g., machines allowing "mixing" of product to fit users taste at the place of consumption), machines that deliver physical goods or digital goods. Transactions can also include sample/information requests, option selections, prepaid use, voting/surveys, reservations, registrations, authorization, access and control/monitoring operations (e.g., opening a gate, accessing a physical door, or a logical account.

A transaction with a registered vending machine, for example, can be initiated when the user captures (e.g., scans, enters, records) information, e.g., a Quick Response (QR) code, a barcode, an image, a text code (e.g., alphanumeric code), audio, or a digital/analog signal, including data collected via a radio interface such as NFC, Bluetooth, beacon or RFID or entered as a text, short message service (SMS) or multimedia message service (MMS) message. For example, the transaction can be initiated with data captured from a displayed code on a vending machine. Information associated with the transaction can be sent to the trusted cloud, including information identifying the user (and/or the user device), the vending machine, and the product to be purchased. The transaction can be authorized in the trusted cloud, then the product desired by the user can be dispensed, or made enabled to be dispensed by an action of the user.

Particular implementations may realize one or more of the following advantages. A transaction can occur using a single transaction request initiated on a user device and sent to the trusted cloud, without PII being exposed at the time of the transaction. Thus, the trusted cloud can be used to turn any connected device into a secure transaction platform.

Accordingly, a first example embodiment may involve receiving, by a computing system, a message from a wireless service provider system. The computing system may include one or more computing devices located, e.g., in the trusted cloud. The message may contain a service-provider-based identity of a client device, an indication that the service-provider-based identity has been authenticated by the wireless service provider, and a code that the client device obtained from a remote machine proximate to the client device. The computing system may generate an anonymized identity of the client device based on the service-provider-based identity. The anonymized identity may have been established by way of a registration of the client device or a user thereof. The computing system may verify that a task associated with the code is within the authorized capabilities of the anonymized identity. Possibly based on the code (and perhaps other information as well), the computing system may transmit an instruction to the remote machine. The instruction may direct the remote machine to perform the task.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as data storage and program instructions. The program instructions may be stored in the data storage, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 22 is a flow chart of a process for providing single-initiation-step transactions using a trusted cloud and connected machines, in accordance with an example embodiment.

DETAILED DESCRIPTION

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Figure 1A:
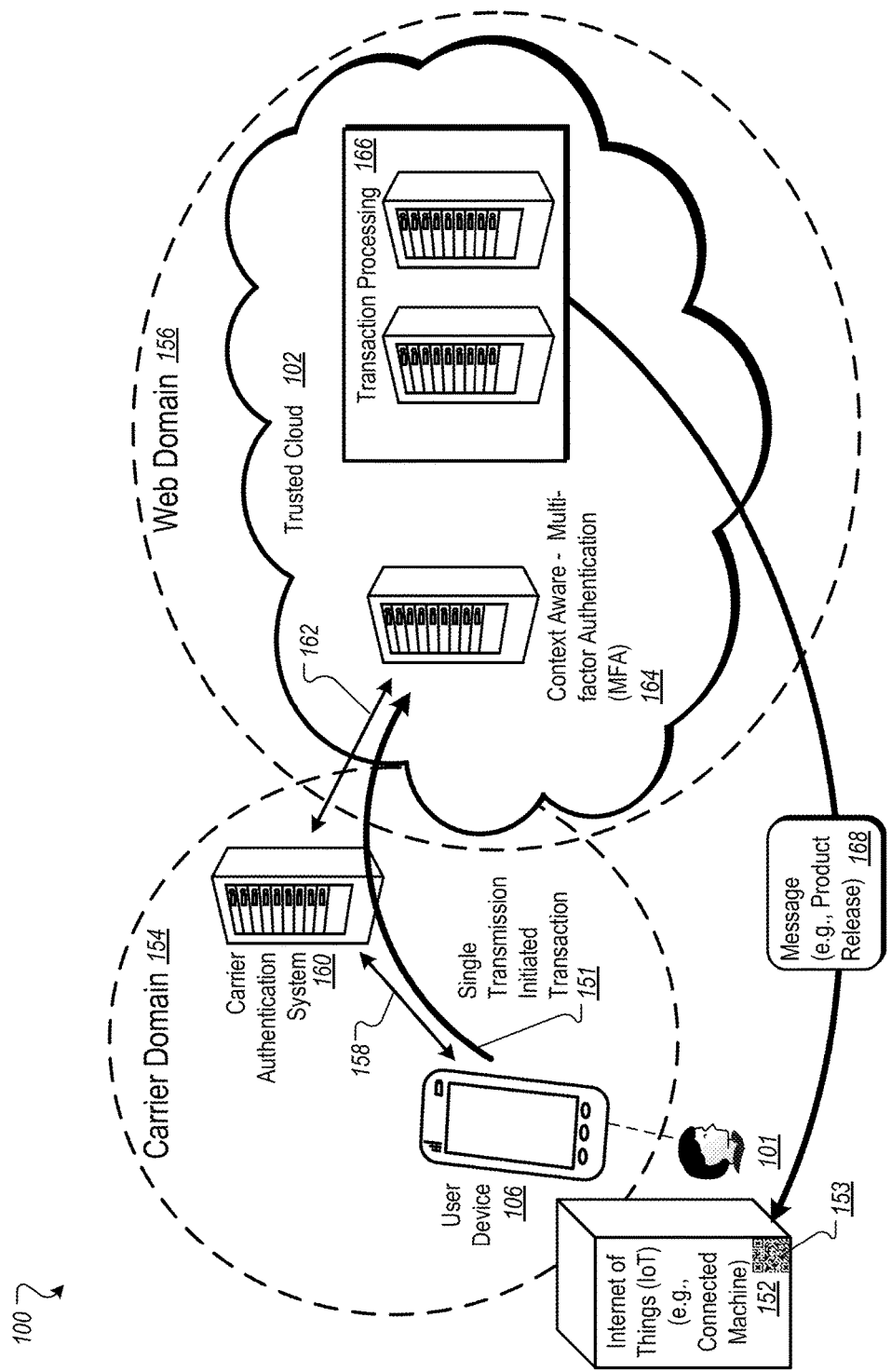
FIG. 1A is a block diagram of an environment for device transactions using a trusted computing system, in accordance with an example embodiment.

FIG. 1A is a block diagram of an example environment 100 for device commerce using a trusted computing system. For example, a user 101 using a user device 106 (e.g., a smartphone) can initiate a single transmission initiated transaction 151 that involves a connected machine 152, such as a transaction to buy a candy bar from a vending machine. Other types of transactions and connected machines 152 are possible, as described below.

The single transmission initiated transaction 151, for example, can originate in a carrier domain 154 (e.g., associated with the user's phone carrier). The single transmission initiated transaction 151 can be completed in a web domain 156. Within the carrier domain 154, for example, the user 101 can use the user device 106 to scan a code 153 (e.g., a QR code associated with a particular snack that can be dispensed by the connected machine 152) to initiate the single transmission initiated transaction 151 as part of a communication 158 with a carrier authentication system 160. Other ways can be used to identify a product or service that is the subject of the single transmission initiated transaction 151, such as by transmission of a text message from the user device 106 that includes a code or some other identifier associated with the connected machine 152 or a product dispensed by the connected machine 152, or in some other way.

The carrier authentication system 160, for example, can authenticate the user 101 and the user device 106, e.g., as being part of a phone plan. If authorization is successful, for example, then an authenticated version of the single transmission initiated transaction 151 can be included in communication 162 that is received by a context-aware multi-factor authentication (MFA) system 164 within a trusted cloud 102. Authentication that occurs in the carrier domain 154 includes authentication that typically occurs between a carrier (e.g., cell phone carrier) and a customer.

The trusted cloud 102 can include a transaction processing system 166, for example, to complete the single transmission initiated transaction 151. For example, as will be described in detail below, the transaction processing system 166 can use existing information available to (or accessible by) the trusted cloud 102, such as payment information for the user 101 and information registered for the connected machine 152. Authorization that occurs in the web domain 156 includes verifying that the user 101 is registered with the trusted cloud 102 and that other conditions of the single transmission initiated transaction 151 are in place (e.g., including user-specified payment methods). If the transaction is authorized by the transaction processing system 166, for example, then the trusted cloud 102 can send a message 168 to the connected machine 152, e.g., to complete the transaction.

For example, if the connected machine 152 is a snack vending machine, then the message 168 can be a message for the vending machine to release (or dispense) the snack chosen by the user 101 (e.g., by scanning the QR code). Additionally, payment for the service or product can be processed using a preferred or pre-specified payment method previously indicated by the user 101. For example, a credit card previously entered by the user 101 can be charged. As another example, a debit to a bank account previously identified by the user 101 can be made by the transaction processing system 166. The transaction can be completed in the above described manner without the connected machine 152 ever transmitting a communication to the transaction processing system 166 in association with the transaction. In this example, the transaction is initiated by the user 101 using the user device 106 without a wireless communication being transmitted by the connected machine 152.

For example, benefits of transactions that occur in the environment 100 include high security with a carrier that authenticates the device (e.g., an AAA radius server or other enterprise grade authentication) to which user is bound. Another benefit, for example, is an ease of use for the user, e.g., as a transaction request is performed simply with one single transmission that is well-suited for mobile commerce. Other conventional methods for performing a mobile transaction may require many more steps, which can raise a barrier to (and slow down) mobile commerce adoption. Optionally, users can also add fingerprints or other biometrics techniques to unlock the device if the mobile phone hardware permits it. Another benefit, for example, is that an initial authentication is complemented by a context aware multi-factor authentication 164, increasing further the security of the solution, as explained below.

In some implementations, other architectures and forms of communication and/or processing are possible. For example, portions of the processing done by the trusted cloud 102 can be external to the trusted cloud 102, and portions of the processing done in the carrier domain 154 can be done elsewhere, such as in the trusted cloud 102 or by a third-party company. Other arrangements are possible.

Figure 1B:
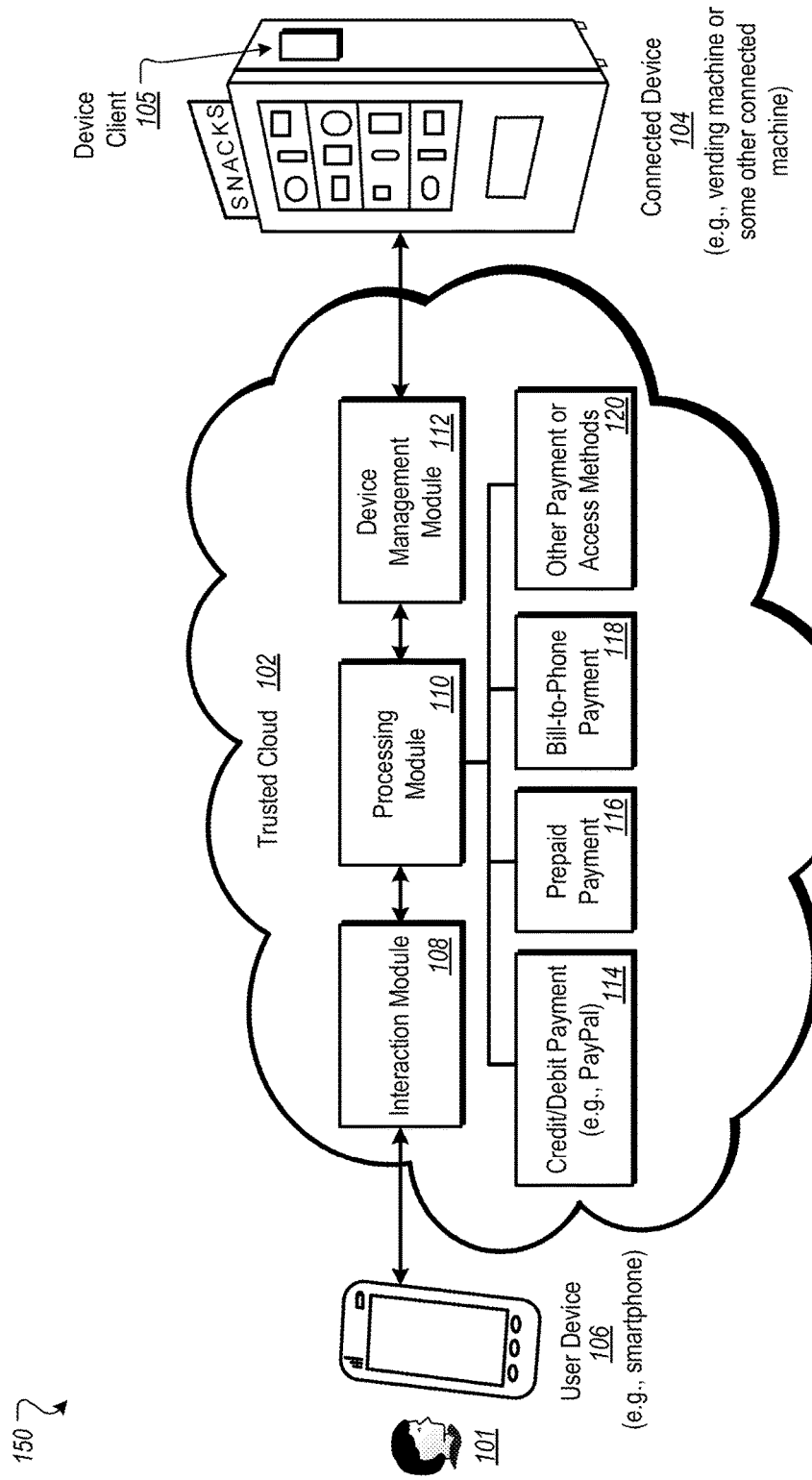
FIG. 1B is a block diagram of an example hierarchy of processing within a trusted cloud for performing trusted transactions, in accordance with an example embodiment.

FIG. 1B is a block diagram of an example hierarchy of processing elements within a trusted cloud 102 for performing trusted transactions in the environment 100. For example, the trusted cloud 102 can process transaction requests received from the user device 106. Information in a transaction request, for example, can include a product identifier, a merchant identifier, a machine identifier, a user identifier, a user device identifier, an amount, and/or other transaction information.

The connected device 104 can include a security software client 105 loaded in the computing unit of the connected device 104. For example, the device client 105 can perform authentication and other security services for communicating securely with the trusted cloud 102 and/or other entities. The computing unit of the connected device 104 also includes a telemetry module for providing online visibility and status of the connected vending machine.

In some implementations, elements 108-120 can perform functions of the transaction processing system 166 described with reference to FIG. 1A. In some implementations, the trusted cloud 102 can include modules 108-112 that perform the primary processing of received transactions.

The interaction module 108, for example, can receive transaction requests (e.g., the single transmission initiated transaction 151) from the user device 106. For example, the interaction module can perform functions related to transaction request validation, product pricing, promotions, and discount policies.

The processing module 110, for example, can process the received transaction and perform processing, including invoking at least one of payment methods 114-120 that are registered (with the trusted cloud 102) by the user 106 for completing transactions. For example, the processing module 110 can determine if a payment is OK or not OK. If the payment is OK, for example, the processing module 110 can interface with payment engines thru APIs and perform user and merchant notifications.

The device management module 112, for example, can manage connected devices 104 (e.g., a connected machine 152, such as a vending machine). For example, the device management module 112 can perform functions related to device (e.g., connected machine) authentication, secure data communications, notification of payment results (e.g., OK/NOK), and notifications for the release of products/information/services.

In some implementations, the device management module 112 can use information about a user's location (e.g., detected by Global Positioning System (GPS), cell phone towers, and/or other methods) to verify that the user's geographic location is in proximity to the connected machine's physical location. For example, the location of the connected machine 152 can be a known latitude/longitude location, a street address, a GPS location, or some other location.

Figure 2:
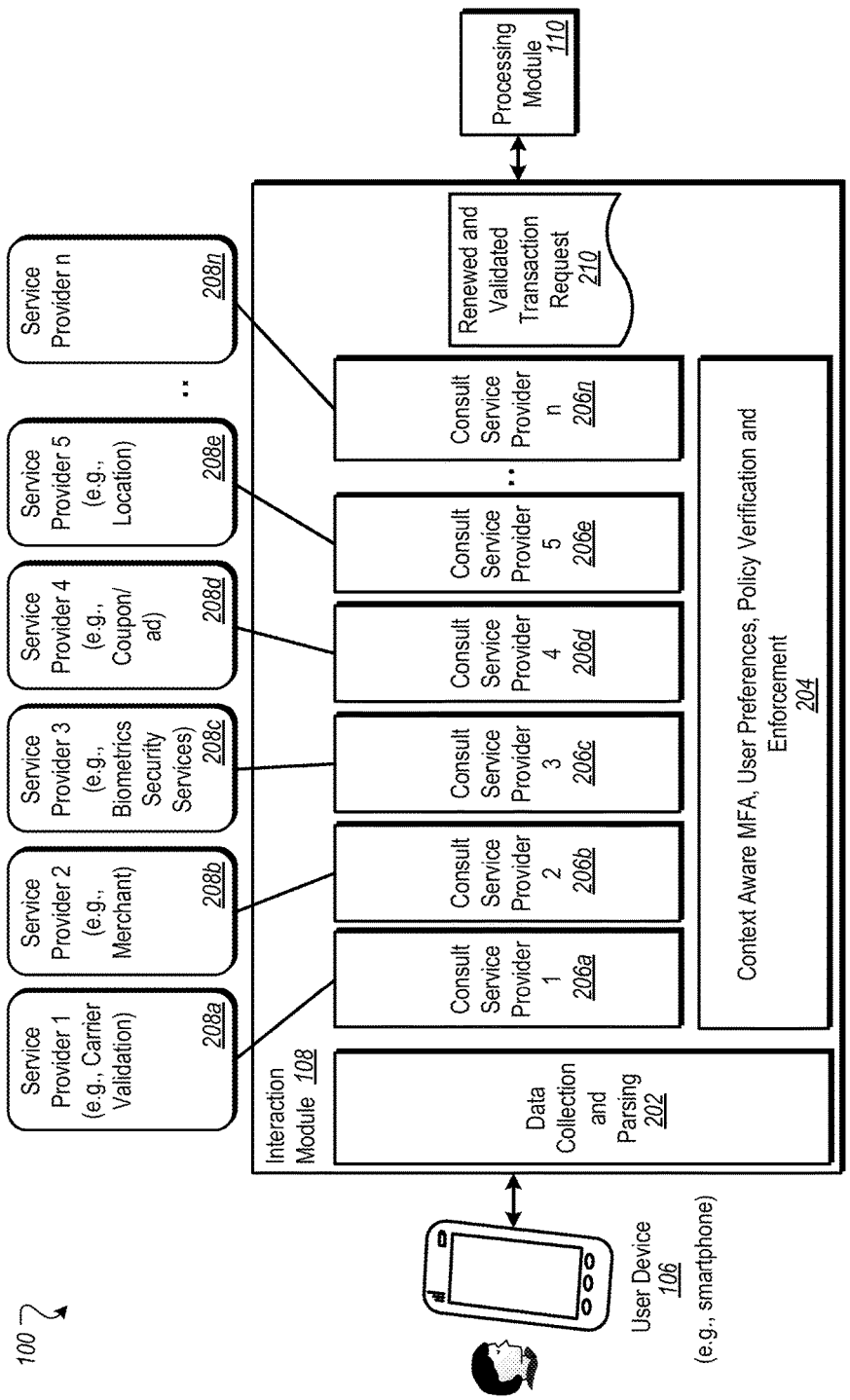
FIG. 2 is a block diagram of an architecture of an interaction module, in accordance with an example embodiment.

FIG. 2 is a block diagram of an example architecture of the interaction module 108. For example, the transactions received from the user device 106 are received by the interaction module 108, e.g., that can broker business policies between connected machines and the trusted cloud 102. In some implementations, the interaction module 108 includes a data collection and parsing module 202, a preferences and policies module 204, and plural consult service provider modules 206a-206n, each corresponding with (and interfacing to) corresponding service providers 208a-208n. For example, the service providers 208a-208n can include service providers for fulfillment organizations, merchants, payment systems, coupons/ads, location, and other service providers. In some implementations, the interaction module 108 can further include modules that interface or are associated with customer relationship management (CRM), inventory management systems, marketing data bases and carrier network APIs that are connected to the trusted cloud 102. The trusted cloud 102 validates the incoming request, consults all service providers 208a-208n, applies business policies, triggers fulfillment on behalf of a service provider (e.g., if approved), declines the request (e.g., if business policies prevent fulfillment), and notifies the user. The fulfillment can be done directly by a connected device (e.g., a vending machine), by a customer support representative (CSR), or via a separate organization. In some implementations, outputs of the interaction module 108 can include a renewed and validated transaction request 210, e.g., that can be provided to the processing module 110 for processing. In some implementations, the series of verification and validation functions performed with the service providers 208a-208n can form "context-aware multifactor authentication."

Figure 3:
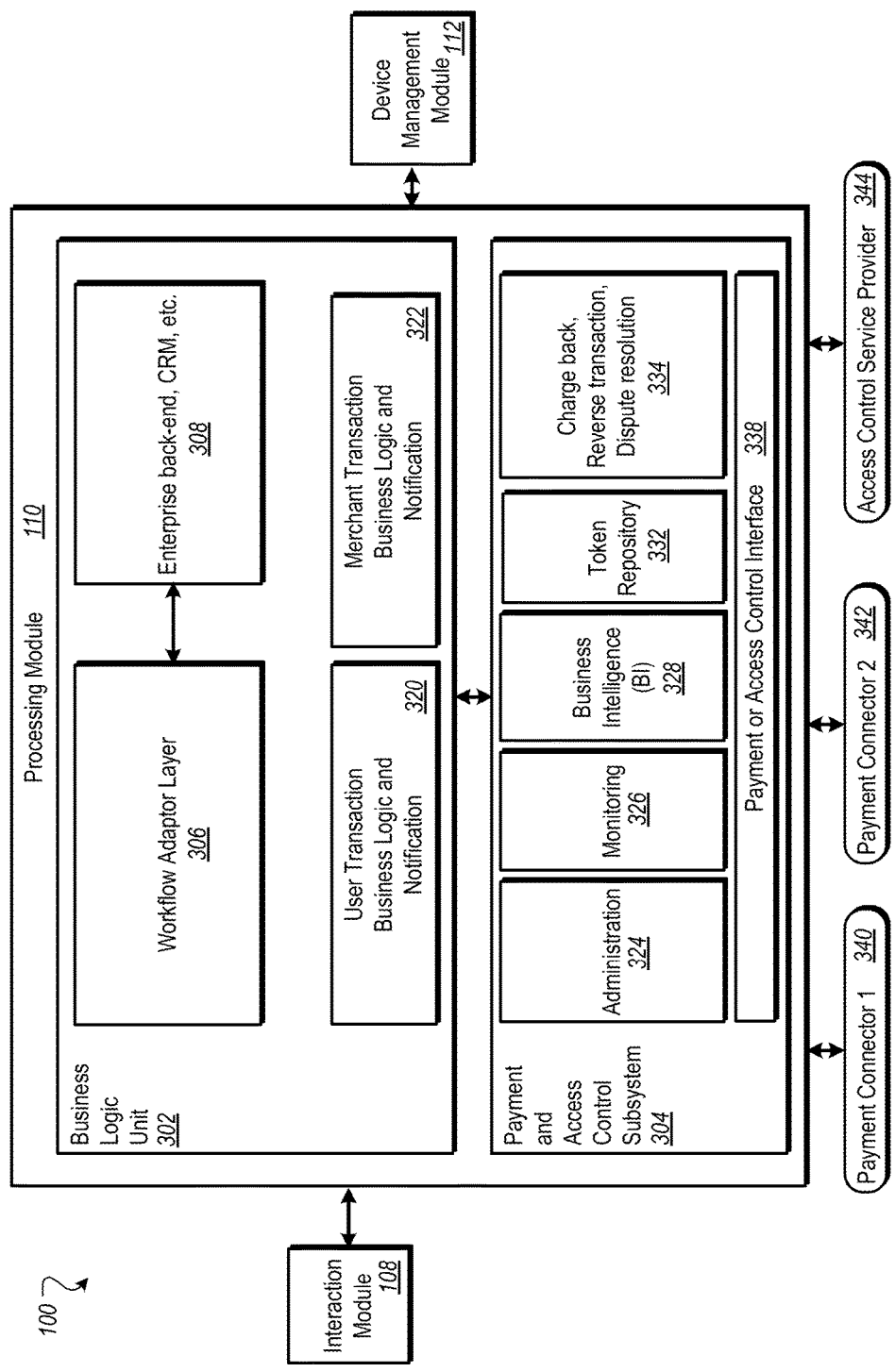
FIG. 3 is a block diagram of an architecture of a processing module, in accordance with an example embodiment.

FIG. 3 is a block diagram of an example architecture of the processing module 110. For example, the processing module 110 can include a business logic unit 302 for applying business rules and other pre-payment actions associated with the transaction, and a processing and access control subsystem 304 for completing the payment. The business logic unit 302 can include, for example, a workflow adaptor layer 306 for applying business-related rules to received transactions and an enterprise back-end 308 that serves as a back-end to the workflow adaptor layer 306. For example, the workflow adaptor layer 306 can include API s for third-party solutions, e.g., including relationship with customers, inventory management, and enterprise backend/databases (e.g., inventory content, directory, etc.). The business logic unit 302 includes a user transaction business logic and notification module 320 and a merchant transaction business logic and notification module 322 for processing user and merchant registrations, requests and notifications for users and merchants, respectively.

The processing module 110 further includes a payment and access control subsystem 304 for handling payments and interfacing with third-party entities. An administration module 324, for example, can perform administrative function of the access control subsystem 304. A monitoring module 326, for example, can monitor payment accounts and other payment-related aspects of the processing module 110. A business intelligence (BI) module 328, for example, can apply business-related aspects to payments for transactions. A token repository 332, for example, can provide a data store of tokens that can be used in transactions, e.g., in lieu of account information and/or personally identifiable information. A charge-back, reverse transition, dispute resolution module 334, for example, can handle recovery, rollback and error recovery in case a problem occurs with a transaction. A payment or access control interface module 338, for example, can serve as an interface, for the payment and access control subsystem 304, to external entities, such as payment connectors 340 and 342 and an access control service provider 344.

In some implementations, the connectors (e.g., 340, 342, 344) can access service providers for third-party payments (e.g., PayPal), loyalty/membership services (e.g. resort club), or enterprise access services (e.g., a company ID). For example, a user can seamlessly pay for the requested product with PayPal if payment is required. In another environment, for example, if a resort offers privileged access to services, then the user request can be fulfilled provided the user has registered the user's resort membership card. In another environment, for example, in an enterprise building, employees could get beverages and snacks from a vending machines (e.g., paid for by the employer) if their respective enterprise IDs are registered. Examples that follow show how the processing module 110 can work with a variety of third-party payment and/or access service providers.

Figure 4:
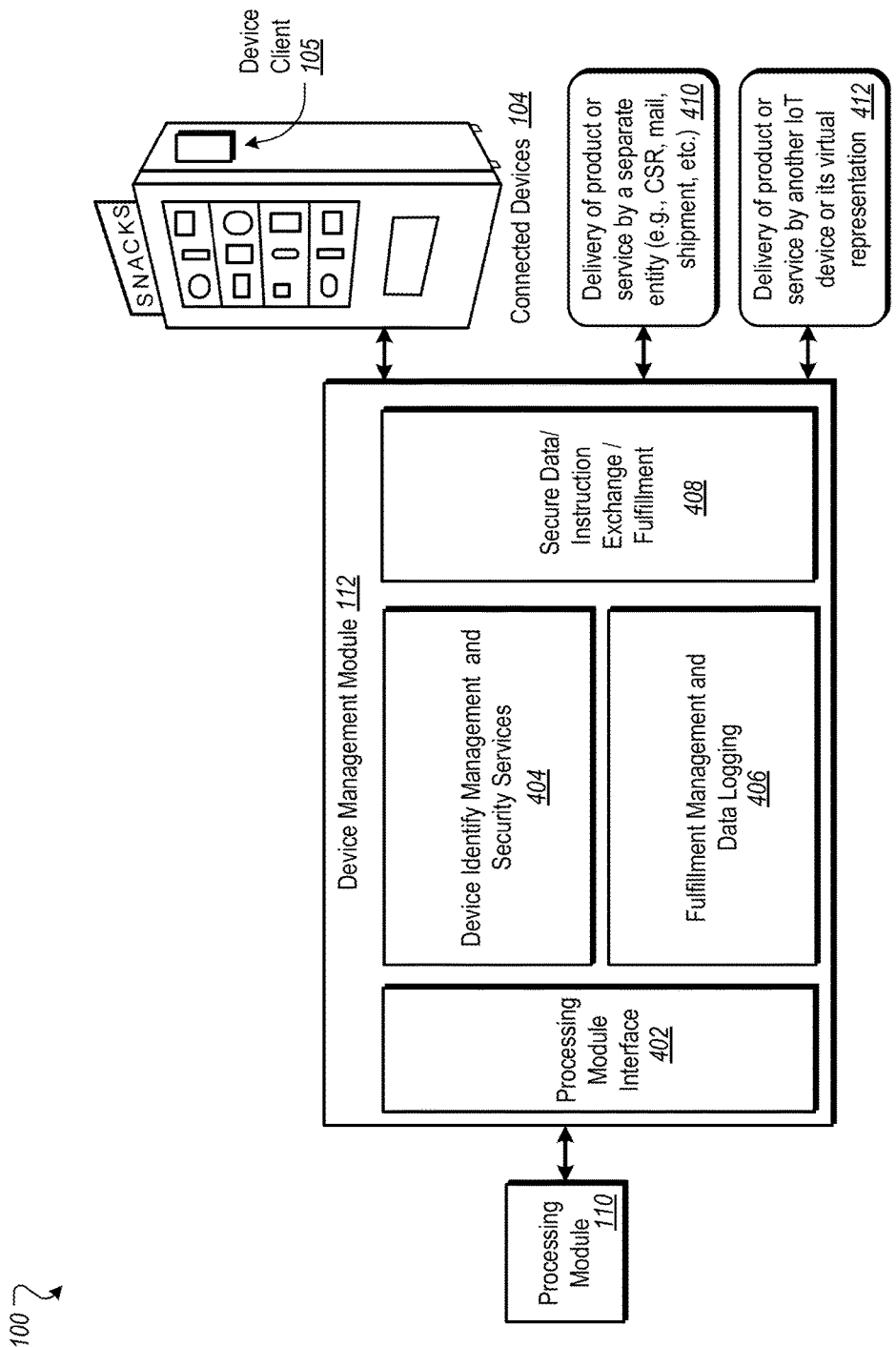
FIG. 4 is a block diagram of an architecture of a device management module, in accordance with an example embodiment.

FIG. 4 is a block diagram of an example architecture of the device management module 112. For example, the device management module 112 can include a processing module interface 402 that serves as an interface to the processing module 110. A device identity management and security services 404, for example, can provide functions for use by the device management module 112 to allow monitoring and management of connected machines. A fulfillment management and data logging module 404, for example, can serve as an interface to fulfillment systems external to the trusted cloud 102. A secure data/instruction exchange/fulfillment module 408, for example, can provide security aspects for the trusted cloud, including notifications to external (to the trusted cloud 102) entities. The device management module 112 can provide notifications, such as a notification 410 for the delivery of a product or a service by a separate entity (e.g., CSR, mail, shipment, etc.), and a notification 412 for the delivery of a product or a service by another IOT device or its virtual representation. Other notifications are possible.

Figure 5:
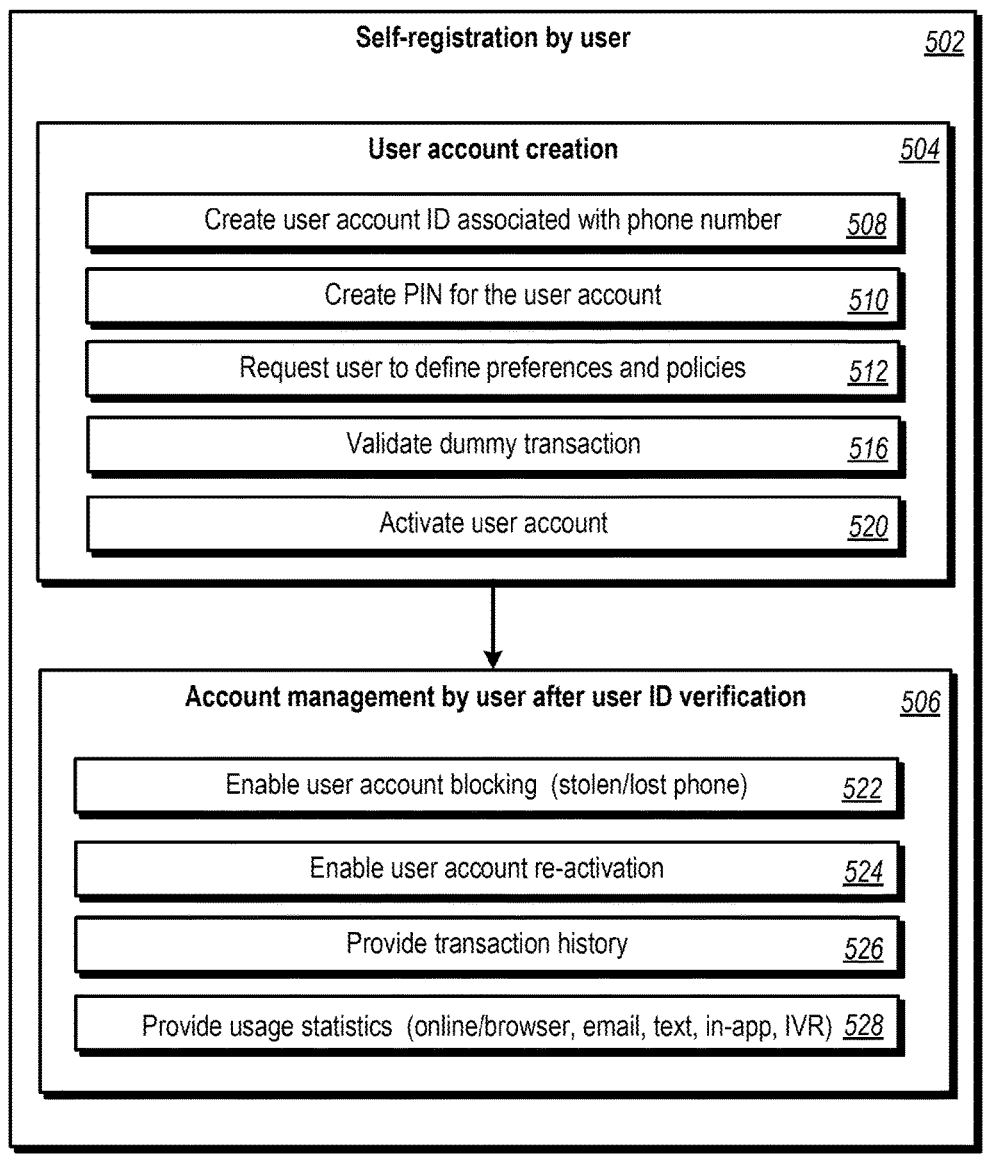
FIG. 5 is a flow diagram of a process for self-registration by a user, in accordance with an example embodiment.

FIG. 5 is a flow diagram of an example process 502 for self-registration by a user. For example, self-registration by a user can include two phases, e.g., self-registration 504 and account management 506. Self-registration 504 can begin, for example, at step 508 when a user account ID associated with a phone number is created. At step 510, a personal identification number (PIN) or some other password is created for the user. At step 512, the user is requested to define preferences and policies, such as preferences identifying accounts and/or payment methods to be used for particular types of transactions and/or monetary amounts (one or more credit cards, debit cards, bank accounts, debit accounts, etc.). At step 516, a dummy transaction (e.g., of a zero or very small amount) is validated, e.g., to test an interface with a payment connection. At step 520, the user account is activated.

In some implementations, user preferences can include information that identifies how certain payments are to be handled. For example, the user can define a preference that indicates "if the charge is less than $5, then use payment method X; if the charge is between $10 and $30, then use payment method Y; otherwise use payment method Z." Other preference can put limits on the number of charges in a day, limits on monetary amounts in a given time period, limits of charges to specific time periods, and so on.

Account management 506 can begin, for example, upon successful activation of the user account. At step 522, user account blocking is enabled, e.g., for potential use upon discovery of a stolen or lost phone. At step 524, user account re-activation is enabled, e.g., to enable a user to reactivate an account, such as if a lost phone is recovered. At step 526, transaction histories are maintained during account management (and over the course of transactions) and are made available to be provided to the user. At step 528, usage statistics are provided, e.g., available online, through a browser, by email, by text, through an app, interactive voice response (IVR), and/or other technologies that allow a computer to interact with humans.

Figure 6:
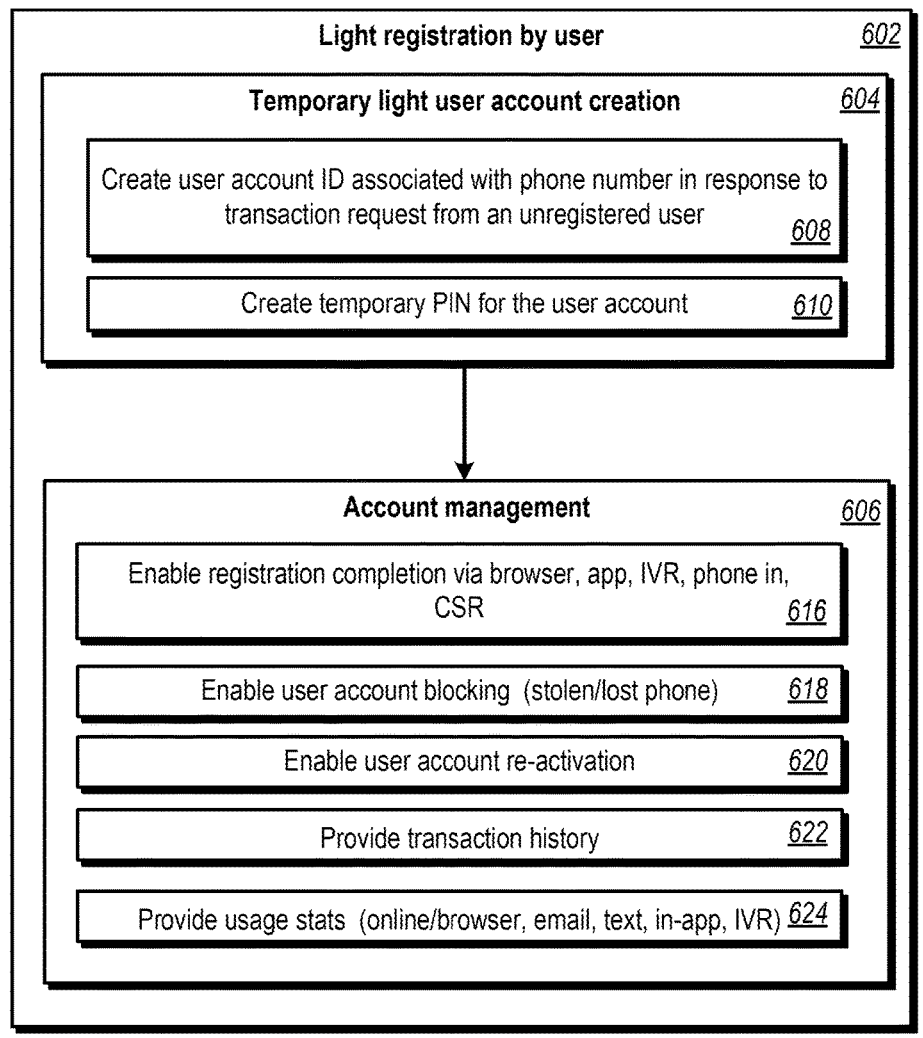
FIG. 6 is a flow diagram of a process for light registration by a user, in accordance with an example embodiment.

FIG. 6 is a flow diagram of an example process 602 for light and anonymous registration by a user. For example, light registration by a user can include two phases, e.g., temporary light user account creation 604 and account management 606. Temporary light user account creation 604 can begin, for example, at step 608, when a user account ID associated with a phone number is created in response to a transaction request from an unregistered user. At step 610, a temporary PIN (or other security code or password) can be created for the user account.

Account management 606 can begin, for example, after creation of the temporary PIN. At step 616, registration completion is enabled via a browser, an app, an IVR, a phone in, or through a customer support representative (CSR). At step 618, user account blocking is enabled, e.g., for potential use upon discovery of a stolen or lost phone. At step 620, user account re-activation is enabled, e.g., to enable a user to reactivate an account, such as if a lost phone is recovered. At step 622, transaction history is provided, e.g., to track user transactions that have occurred. At step 624, usage statistics are provided, e.g., available online, through a browser, by email, by text, through an app, IVR, and/or other technologies that allow a computer to interact with humans.

Figure 7:
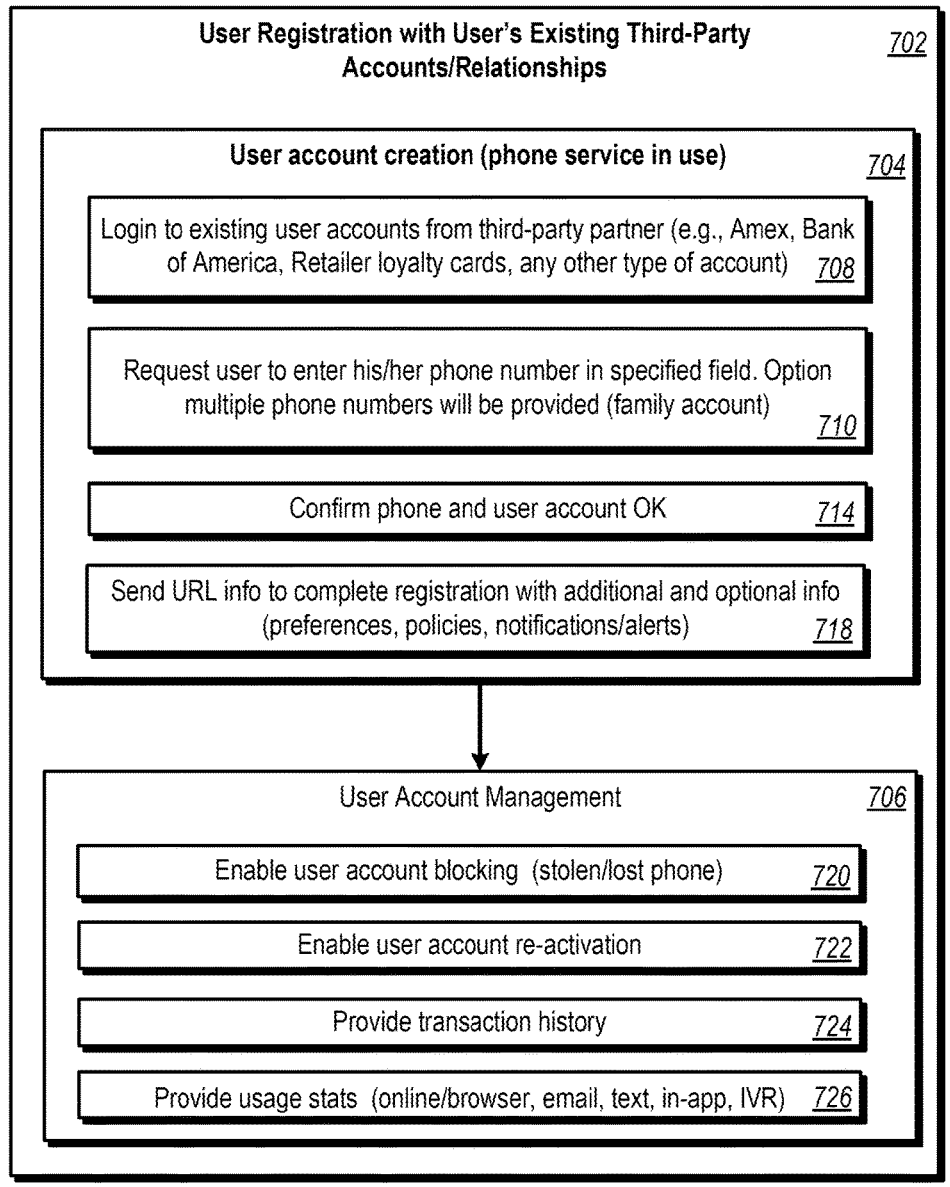
FIG. 7 is a flow diagram of a process for user registration with user's existing third-party accounts and/or relationships, in accordance with an example embodiment.

FIG. 7 is a flow diagram of an example process 702 for user registration with the user's existing third-party accounts/relationships. For example, user registration with the user's existing third-party accounts/relationships can include two phases, e.g., user account creation 704 (e.g., for the user's current phone) and user account management 706 (e.g., enabling registration completion via a browser, an app, IVR, via phone in, or by CSR). During user account creation 704, for example, at step 708, a user can log in to an existing user account from third-party partner (e.g., associated with a credit card, a bank, a retailer loyalty card, or some other type of account). At step 710, the user can be requested to enter the user's phone number, e.g., in a specified field. In some implementations, optional multiple phone numbers can be provided, e.g., for a family account associated with multiple phones belonging to members in the same family or other group. At step 714, the user can confirm the phone number and user account. At step 718, to complete registration, URL info is sent with additional and optional info (e.g., preferences, policies, notifications/alerts). In some implementations, the URL included with the transmitted information can be selected to access a web portal that can be used to add additional information (e.g., additional user preferences, payment types, associated devices, etc.) to complete a registration process or edit an account. In some implementations, user data can be imported from third-party accounts and registered automatically in the user account with a secure import method.

User account management 706 can begin once the user account is created. For example, at step 720, user account blocking is enabled, e.g., for potential use upon discovery of a stolen or lost phone. At step 722, user account re-activation is enabled, e.g., to enable the user to reactivate an account, such as if a lost phone is recovered. At step 724, transaction history is provided, e.g., to track user transactions that have occurred. At step 726, usage statistics are provided, e.g., available online, through a browser, by email, by text, through an app, IVR, and/or other technologies that allow a computer to interact with humans.

Figure 8:
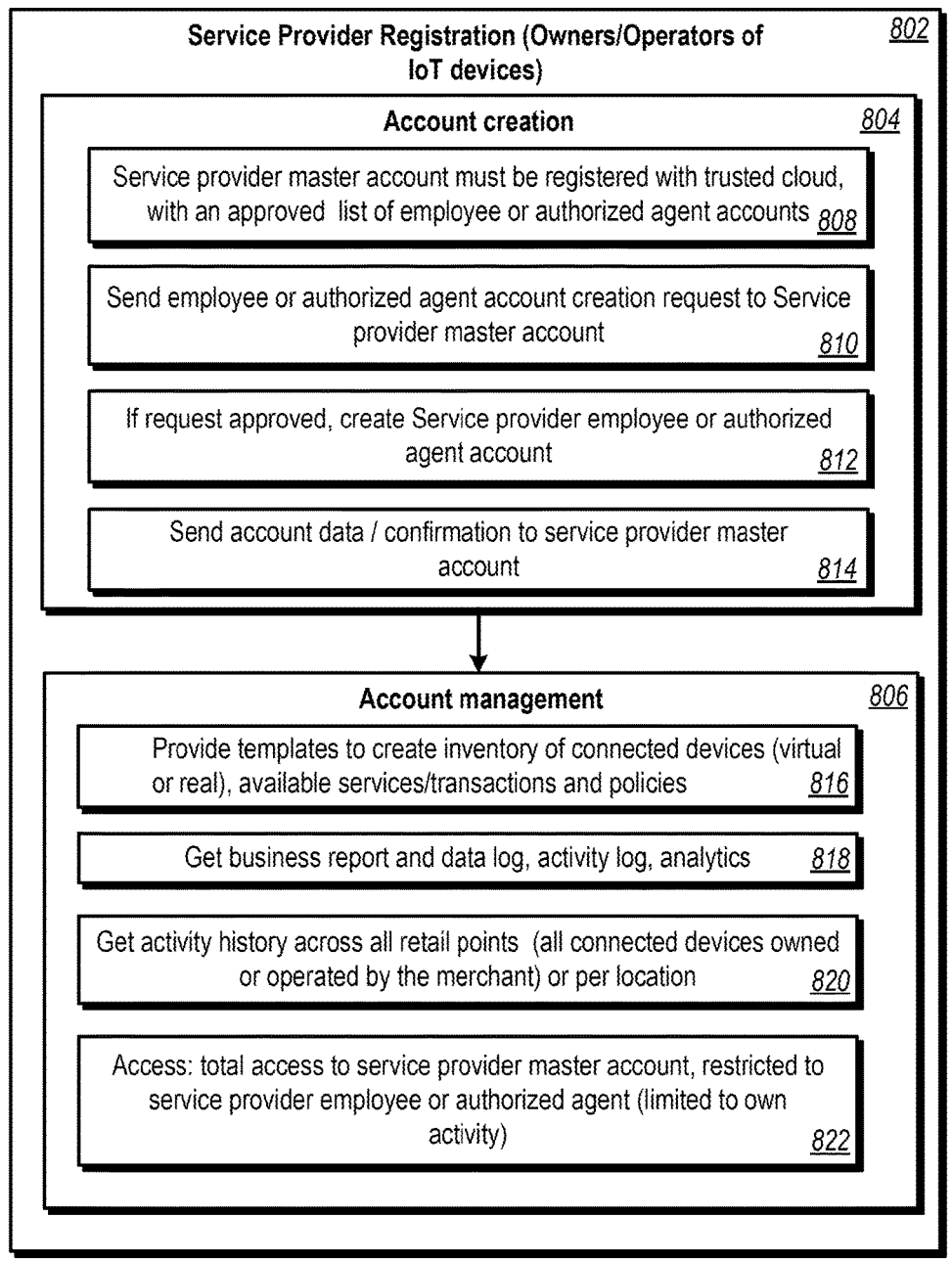
FIG. 8 is a flow diagram of a process for service provider registration by owner and/or operators of connected devices, in accordance with an example embodiment.

FIG. 8 is a flow diagram of an example process 802 for service provider registration by owners/operators of connected devices. For example, the process 802 can include two phases: account creation 804 and account management 806.

At step 808, a service provider master account is registered with the trusted cloud 102, e.g., with an approved list of employee or authorized agent accounts. At step 810, an employee or authorized agent account creation request is sent to the service provider master account. At step 812, if the request approved, a service provider employee or authorized agent account is created. At step 814, account data and a confirmation are sent to service provider master account.

At step 816, templates are provided to create an inventory of connected devices (virtual or real), available services/transactions and policies. At step 818, business report and data log, activity log data, and analytics data are obtained. At step 820, activity history across some or all retail points is obtained, e.g., including some or all connected devices owned or operated by the merchant, on a per-location basis, or some other grouping. At step 822, access is provided to the service provider master account, e.g., restricted to service provider employees or authorized agents (e.g., limited to their own activity).

Figure 9:
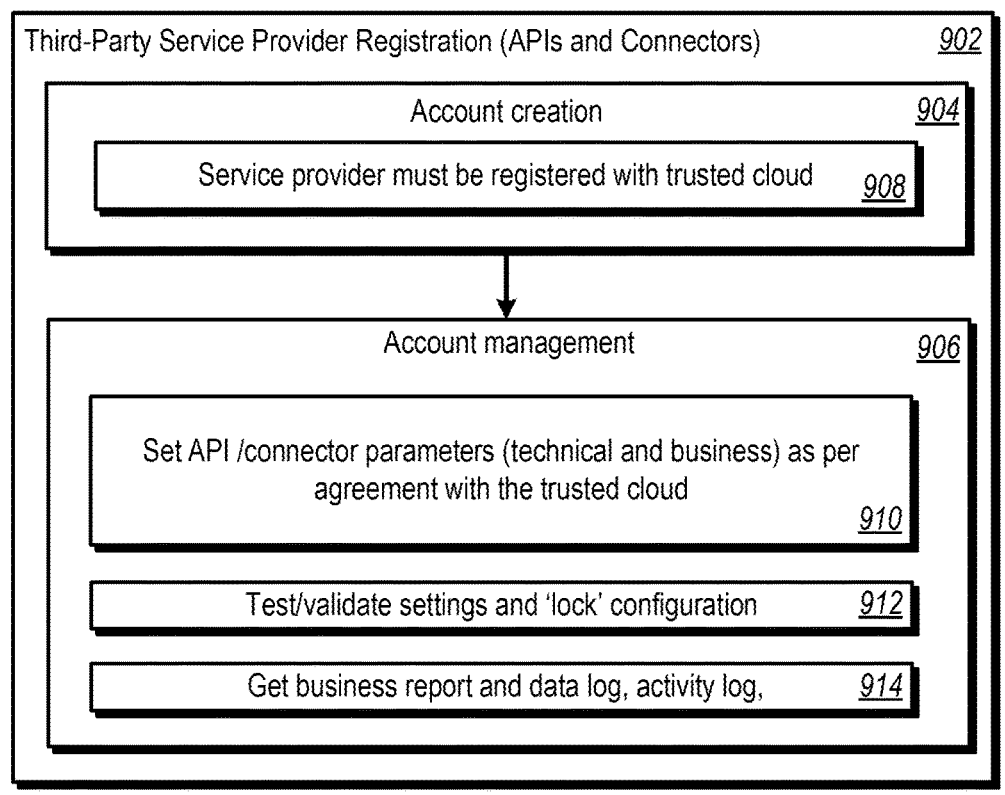
FIG. 9 is a flow diagram of a process for third-party service provider registration and associated APIs and connectors, in accordance with an example embodiment.

FIG. 9 is a flow diagram of an example process 902 for third-party service provider registration and associated APIs and connectors. For example, the process 902 can include two phases: account creation 904 and account management 906. Service provider is registered (908) with trusted cloud.

During account management 906, for example, at step 910, API/connector parameters (technical and business) are set according to existing agreements, e.g., with the trusted cloud 102. At step 912, settings and a "lock" configuration are tested/validated. At step 914, business report, data log, and activity log data are obtained.

Figure 10:
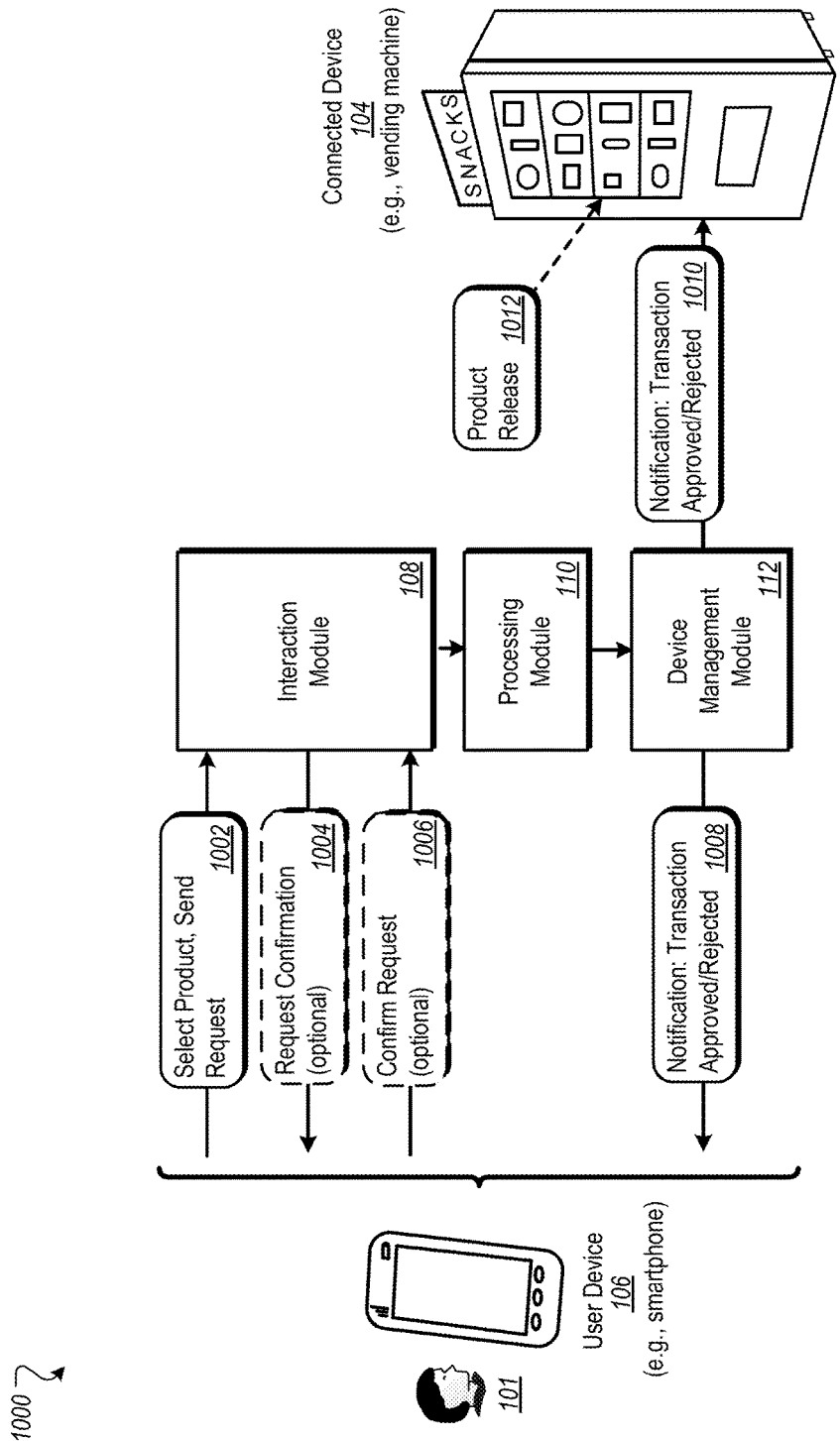
FIG. 10 is a conceptual flow diagram of a process for a user transaction with a connected machine, in accordance with an example embodiment.

FIG. 10 is a conceptual flow diagram of an example process 1000 for a user transaction with a connected machine. For example, a transaction in the process 1000 can begin with a transaction request 1002, e.g., that includes or identifies a selected product. The transaction request 1002 can be received by the interaction module 108 as described above.

In some implementations, the transaction can include a confirmation request 1004 e.g., sent by the interaction module 108, such as to display a confirmation message to the user on the user device 106. In response, a confirmation 1006 can be sent to the processing module 110. If everything in the transaction is authorized and successful, including payment, then device management module 112 can send an approval notification 1008 to the user device 106 and a notification 1010 to the connected machine 104, e.g., to dispense the product, at which time product release 1012 occurs.

Figure 11:
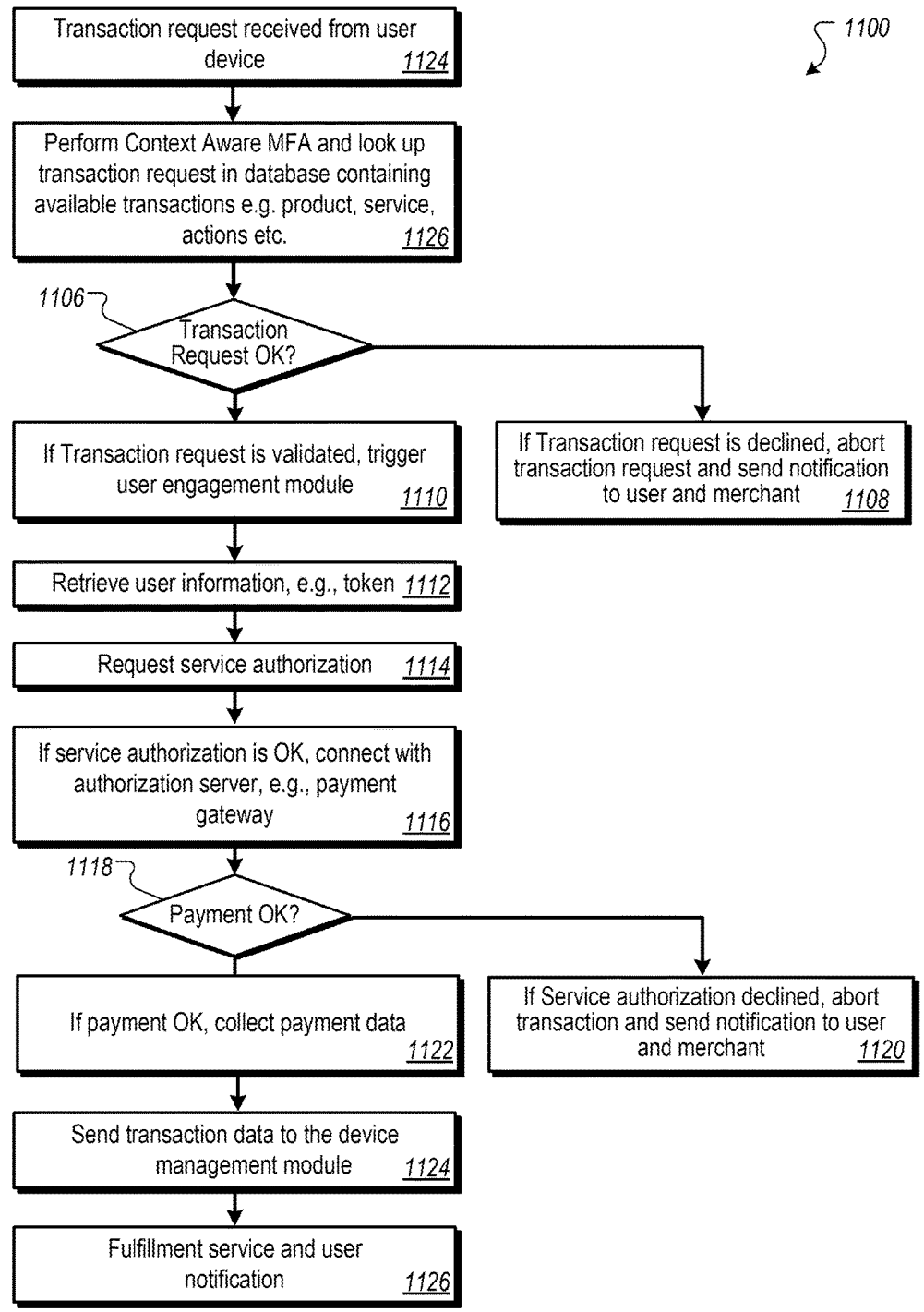
FIG. 11 is a flow diagram of a process for a user transaction with a connected machine, in accordance with an example embodiment.

FIG. 11 is a flow diagram of an example process 1100 for a user transaction with a connected machine. At step 1102, a transaction request is received from a user device, e.g., the single transmission initiated transaction 151 is received from the user device 106. At step 1104, context aware multi-factor authentication (MFA) is performed, and information associated with the transaction request is looked up in a database containing available transactions, e.g. related to product, service, actions, etc. At step 1106, a determination is made (e.g., by the interaction module 108) whether the transaction request is OK, e.g., that information identified in the transaction request is complete and correct. At step 1108, if the transaction request is declined, then the transaction is aborted and notifications are sent to the user (e.g., for display on the user device 106) and to the merchant.

At step 1110, if the transaction request is validated, then the user engagement module 110 is triggered. At step 1112, user information is retrieved, e.g., including a token associated with the user. At step 1114, service authorization is requested, e.g., using at least one of the consult service provider modules 206a-206n. At step 1116, if service authorization is OK, a connection is made with an authorization server, e.g., a payment gateway, to determine if payment associated with the transaction is authorized. At step 1118, a determination is made whether payment is authorized. At step 1120, if service authorization related to payment is declined, then the transaction is aborted and notifications are sent to the user (e.g., for display on the user device 106) and to the merchant.

At step 1122, if the payment is OK, then payment data is collected (e.g., by the user engagement module 110). At step 1124, transaction data is sent to the device management module 112 for further processing. At step 1128, fulfillment occurs (e.g., a snack is dispensed from a vending machine) and a notification is sent to the user.

Figure 12:
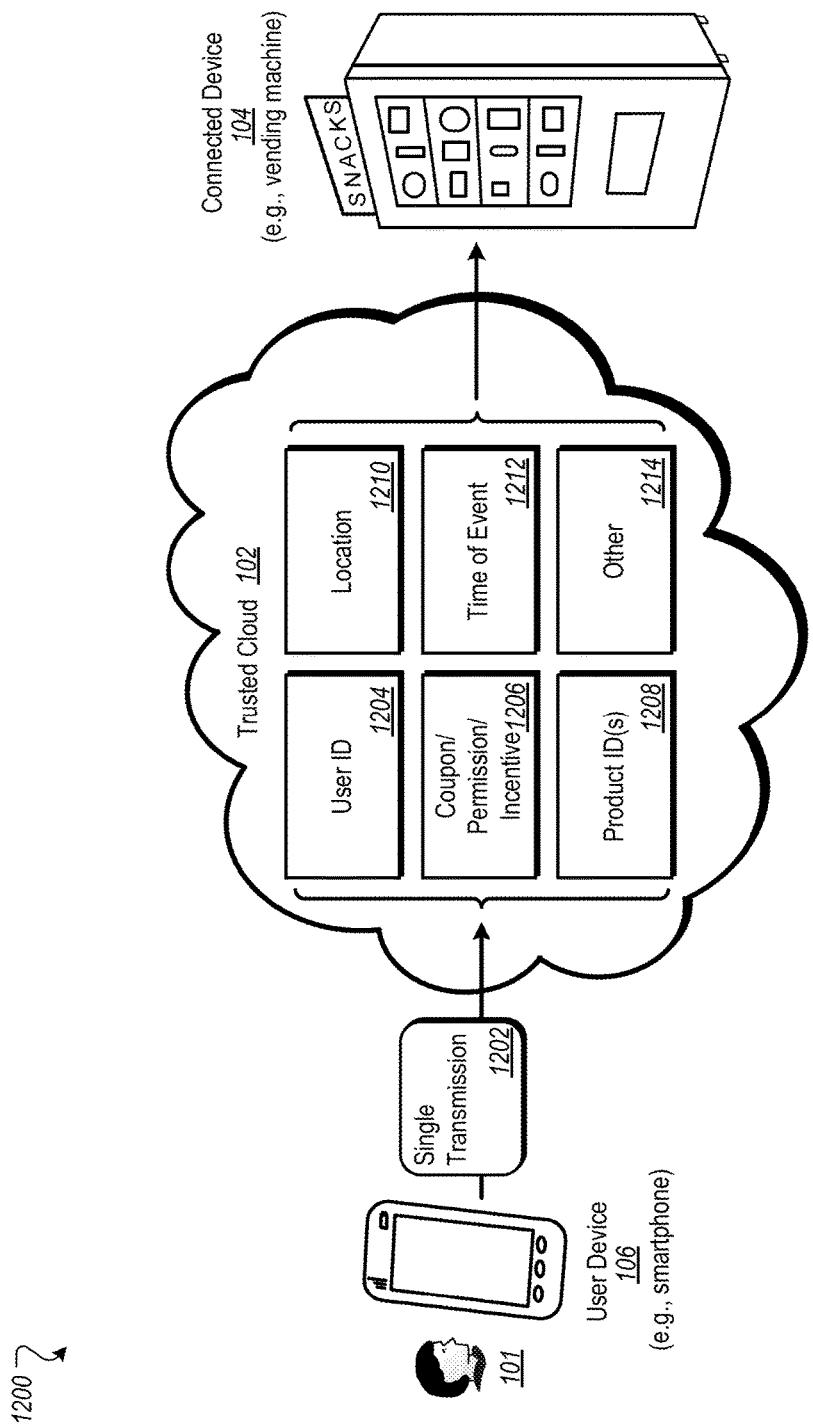
FIG. 12 is a conceptual flow diagram of a single-transmission-initiated process for a user transaction using associated transaction components, in accordance with an example embodiment.

FIG. 12 is a conceptual flow diagram of an example single-transmission-initiated process 1200 for a user transaction using associated transaction components. For example, a single transmission 1202 can be sent by the user device 106, e.g., without an associated or parallel transmission from the connected device 104. When the transaction is processed in the trusted cloud 102, information associated with transaction that is processed at this time includes a user ID of the user (e.g., based on the user's phone plan and registration information). Also, a location 1210 associated with the transaction is compared to a known location of the associated connected device (e.g., as identified in a product ID 1208, that further identifies the product or service of the transaction). Coupon/permission/incentive information 1206 is also processed, e.g., to automatically process the user's pre-loaded coupons and/or offers offered by the merchant. Information processed for the transaction can also include a time of the event 1212 and other information 1214.

Figure 13:
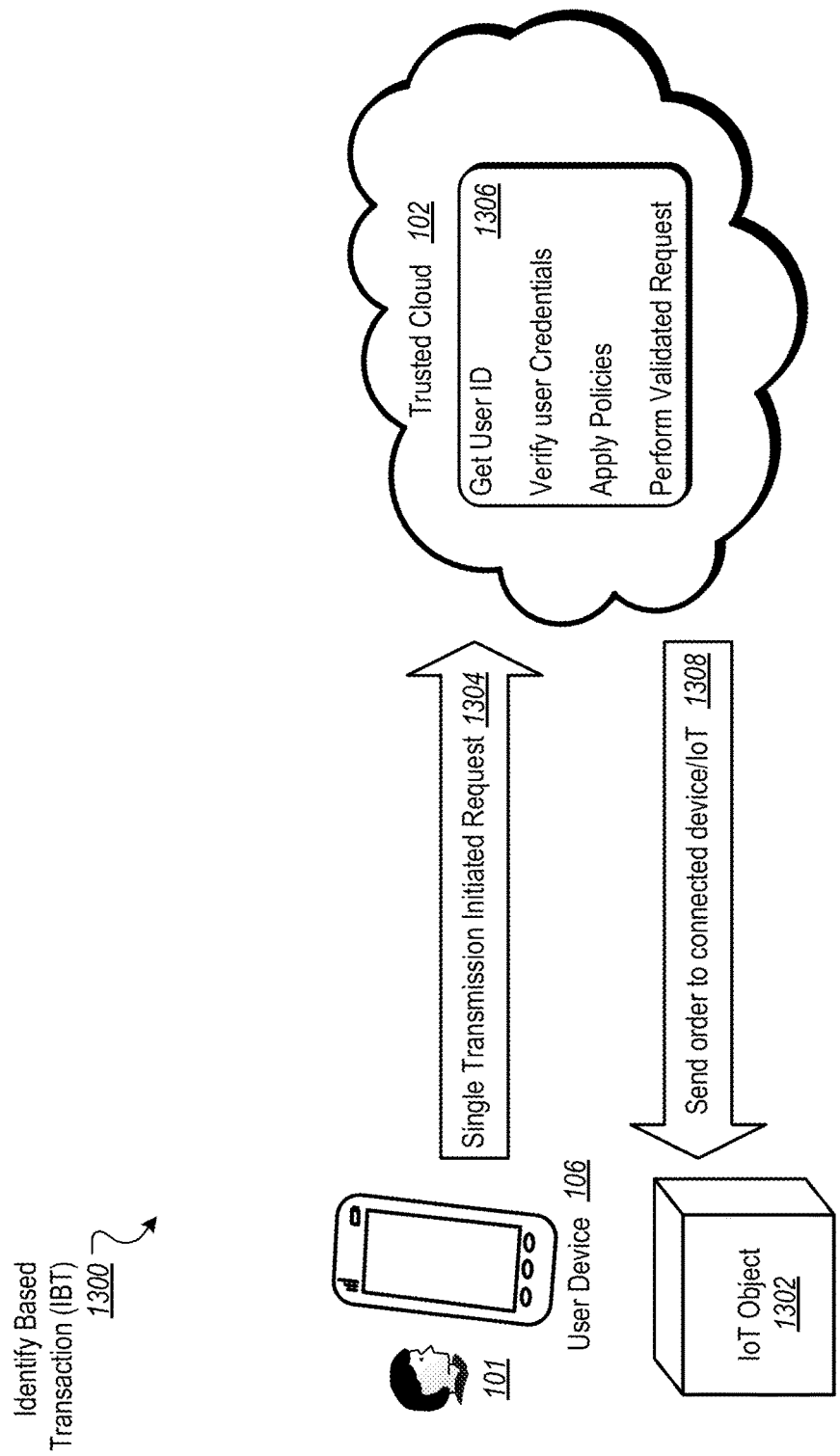
FIG. 13 is a conceptual flow diagram of a single-step process for an identity based transaction using a data protocol, in accordance with an example embodiment.

FIG. 13 is a conceptual flow diagram of an example single-step process for an identity based transaction 1300 using a data protocol. For example, the identity based transaction 1300 can be a transaction involving the user device 106 and an IOT object 1302 (e.g., a connected device). Upon the user scanning a QR code or otherwise identifying a product or service (or a specific connected machine), the user device 106 can send a single transmission initiated request 1304 to the trusted cloud. In some implementations, the user ID can be derived from the mobile device identifier through several methods: phone number, device unique number from manufacturer, other identifiers such as device MAC ID, a combination of these data and/or a data obtained from one of several of these identifiers with a mathematical transformation or tokenization.

Processing 1306 in the trusted cloud can include getting the user ID (e.g., to access user account information for the user 101), verifying user credentials, applying policies, and performing the validated request. If the transaction is approved, including payment information, then the trusted cloud can send an order to the connected device/IOT 1308 (e.g., a notification) to the identified device (IOT object 1302), e.g., to dispense the product or provide the service that is associated with the transaction. The transaction 1300, for example, can characterize an identity-based transaction process that is more secure than conventional methods, which can transmit, across networks and devices, sensitive user credentials (e.g., retail payment or enterprise network access).

Figure 14:
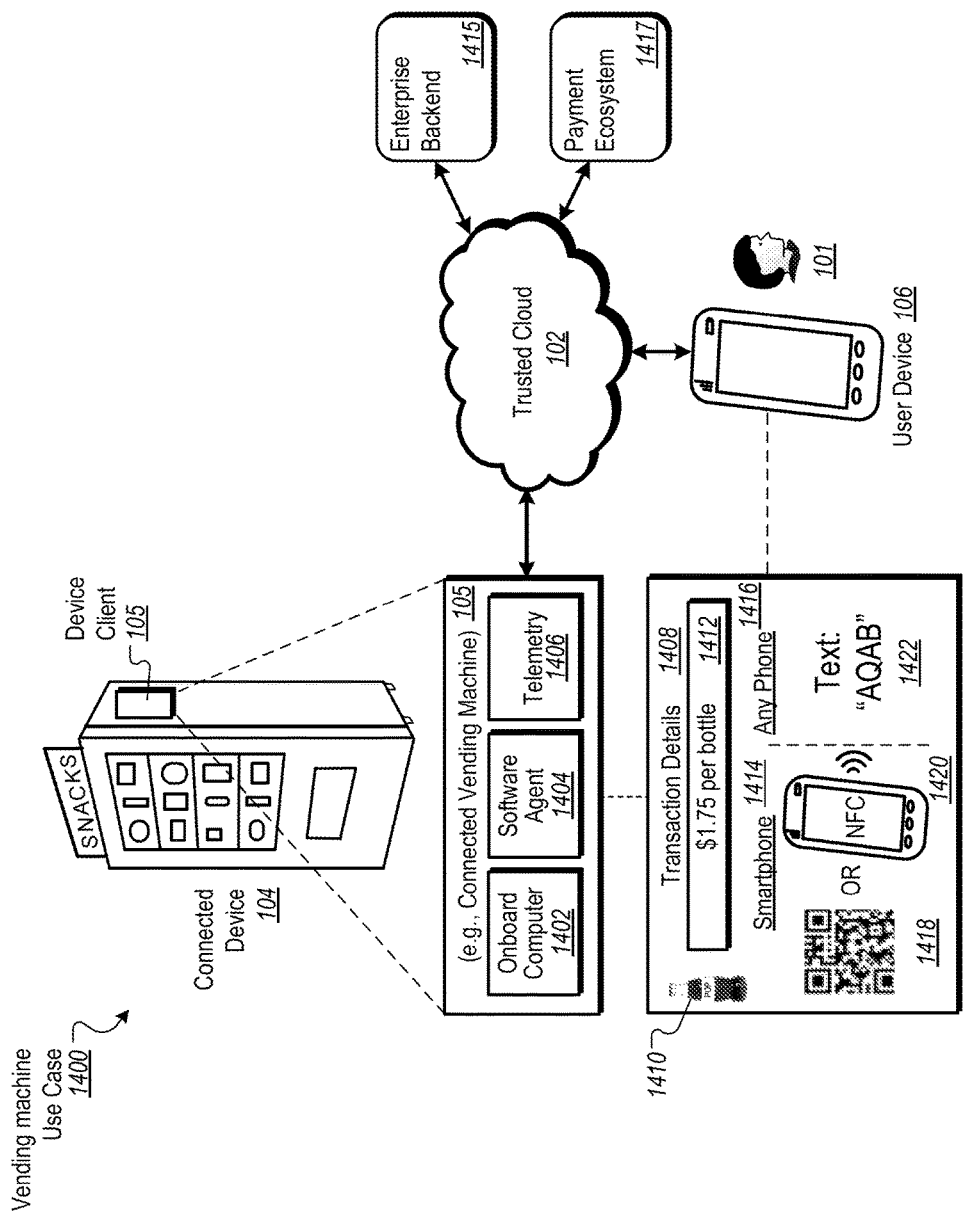
FIG. 14 is a conceptual flow diagram of a vending machine use case process for a vending machine transaction using the trusted cloud, in accordance with an example embodiment.

FIG. 14 is a conceptual flow diagram of an example of a vending machine use case process 1400 for a vending machine transaction using the trusted cloud 102. For example, the device client 105 can include an onboard computer 1402 for performing processing, a software agent 1404 for communicating with the trusted cloud 102 and an enterprise backend 1415, and a telemetry module 1406 for providing online visibility and status of the connected vending machine.

Transaction details 1408 (e.g., for a transaction for buying a beverage 1410) includes looking up and applying a product price 1412 (e.g., that can further be displayed on the vending machine and is known by the trusted cloud, based on a product ID). The transaction can be initiated using a smartphone 1414, e.g., by scanning a QR code 1418 or by receiving product information using near-field (NFC) communication 1420. Alternatively, the transaction can be initiated on the smartphone 1414 or any phone 1416 by entering a code 1422 as a text or SMS message that is to be sent to the trusted cloud 102. The transaction includes a payment, e.g., to a payment ecosystem 1417. For example, the trusted cloud 102 can interact with the payment ecosystems through connectors as explained with reference to FIG. 3.

Figure 15:
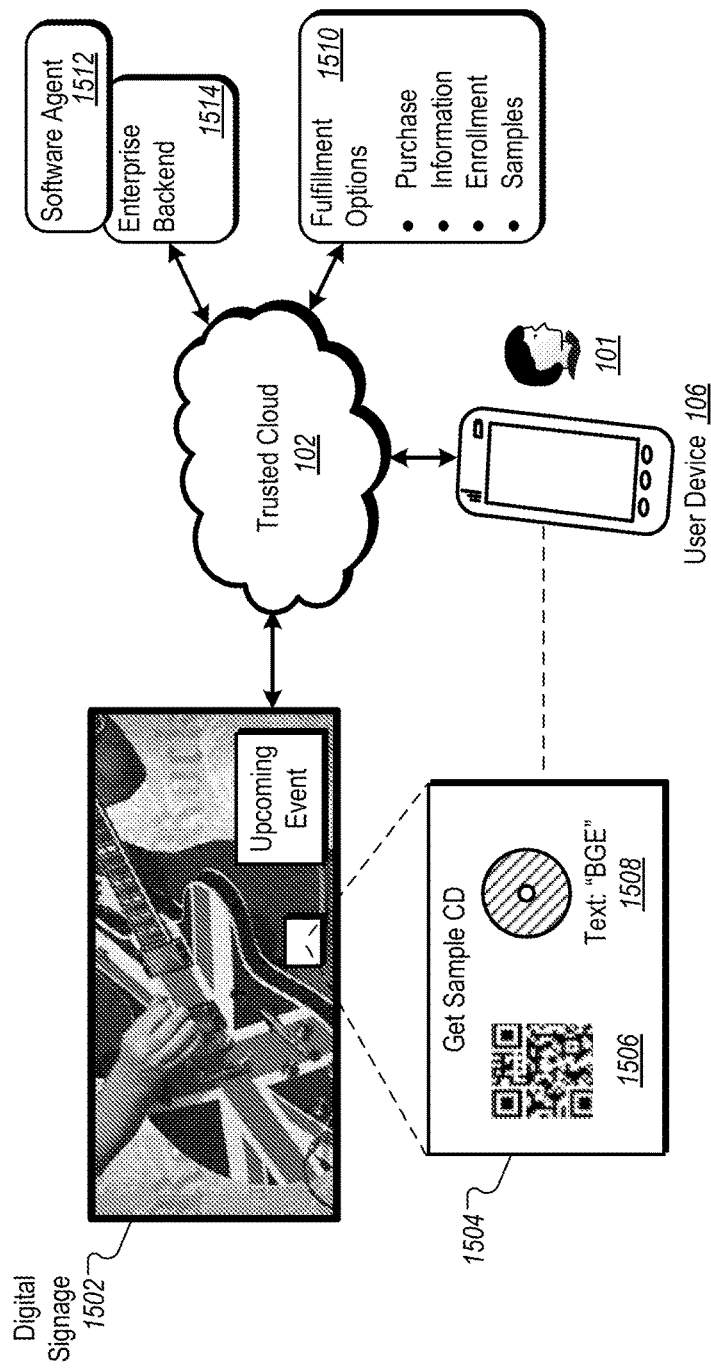
FIG. 15 shows a scenario of a transaction using digital signage, in accordance with an example embodiment.

FIG. 15 shows an example scenario of a transaction using digital signage 1502. A transaction is initiated by the user 101 using the user device 106. The user 101 can scan a QR code 1506 or enter an SMS message 1508 in response to information 1504 displayed on the digital signage A (e.g., "get a sample CD"). Information for the transaction can be received at the trusted cloud 102 which can perform operations 1510, such as a purchase, information providing, enrollment, or the ordering of samples. The information can be provided to an enterprise backend 1514, e.g., using a software 1512. The result of the transaction, for example, can be a user purchase of a product, user enrollment, or the generation of an order to provide (e.g., direct mail or by the Internet) a sample to the user 101 or possibly event tickets to the user 101. In some implementations, the digital signage 1502 is replaced by static signage. For example, a QR code or a barcode of a static sign can be scanned by the user device 106, or an RFID tag included in a static sign can be read by an RFID reader of the user device 106 to initiate the transaction.

Figure 16:
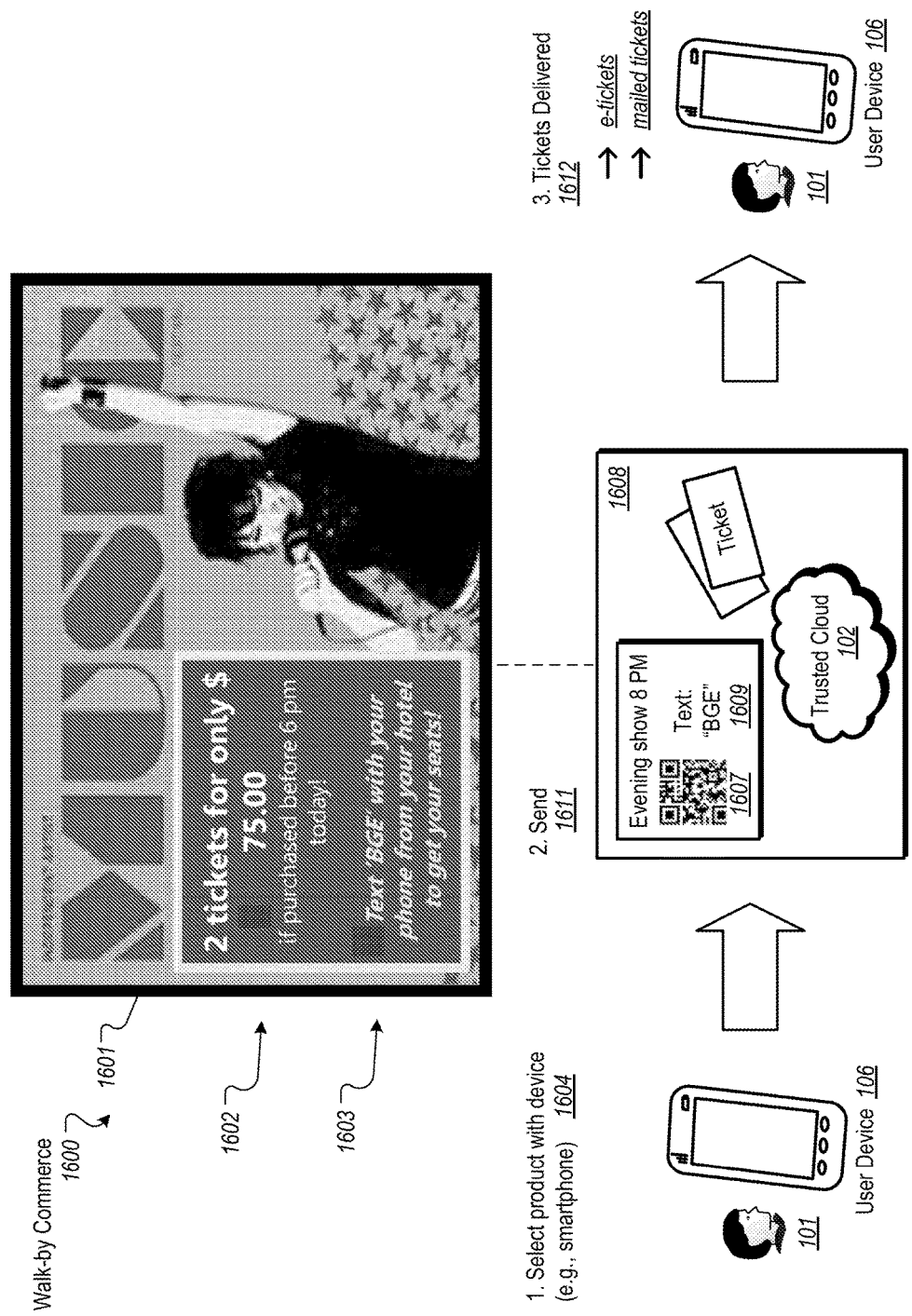
FIG. 16 shows a scenario of walk-by commerce that is associated with a walk-by advertisement, in accordance with an example embodiment.

FIG. 16 shows an example scenario of walk-by commerce 1600 that is associated with a walk-by advertisement 1601. The walk-by advertisement 1601 can include information 1602 for a product or service (e.g., two tickets for $75 to a show) and instructions 1603 for starting the transaction. The transaction can be initiated when a user uses the mobile device 106 to scan a QR code 1607 or some other code, or the user enters text 1609 (e.g., "BGE" as an SMS message). Transaction information 1608 is sent 1611 by the mobile device to the trusted cloud 102. When the transaction is authorized, the transaction is completed 1612 (e.g., e-tickets are provided to the user's mobile device 106). This example is a digital signage example. The product of this device, for example, includes information provided to the user that identifies where the user can obtain the tickets. The user can text "BGE" to the trusted cloud or to a phone number associated with the trusted cloud. The code "BGE" can identify the digital signage or the tickets that are to be obtained. For example, the cloud can map the code "BGE" to the organization that provides the ticket.

Figure 17:
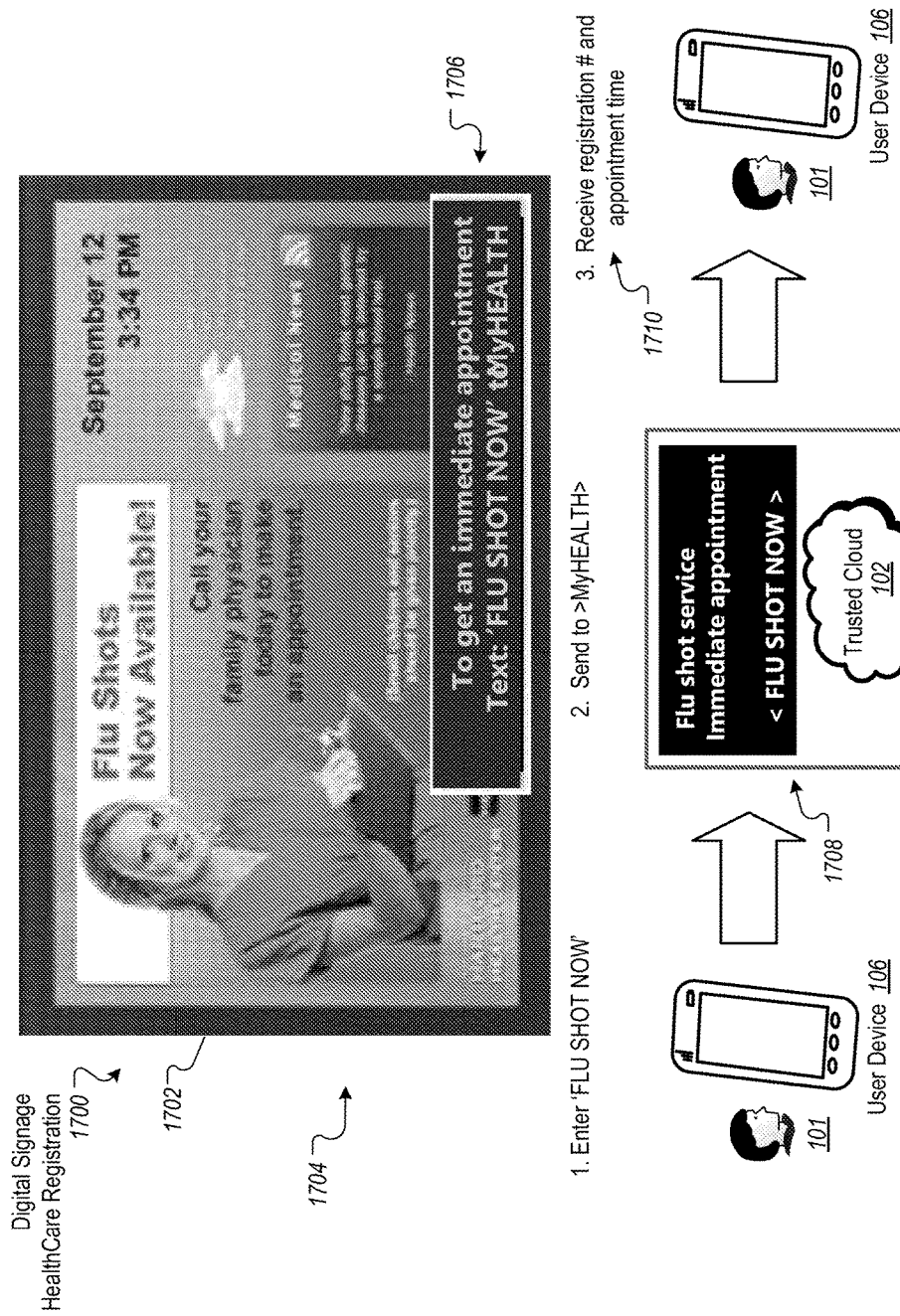
FIG. 17 shows a scenario of a transaction associated with a medical appointment advertisement, in accordance with an example embodiment.

FIG. 17 shows an example scenario of a transaction 1700 associated with a medical appointment advertisement 1702. The advertisement 1702 can include information 1704 for a product or service (e.g., flu shots) and instructions 1706 for starting the transaction (e.g., texting a message to a recipient). The transaction can be initiated when a user enters the designated text 1708 on a mobile device and sends the message to a recipient (e.g., a health care provider identified to the trusted cloud 102 as "MyHealth" or some other code, e.g., that can also be the recipient of a text message). The message is received in the trusted cloud 102. When the transaction is authorized, the user receives a registration number and appointment time 1710 on the mobile device.

Figure 18:
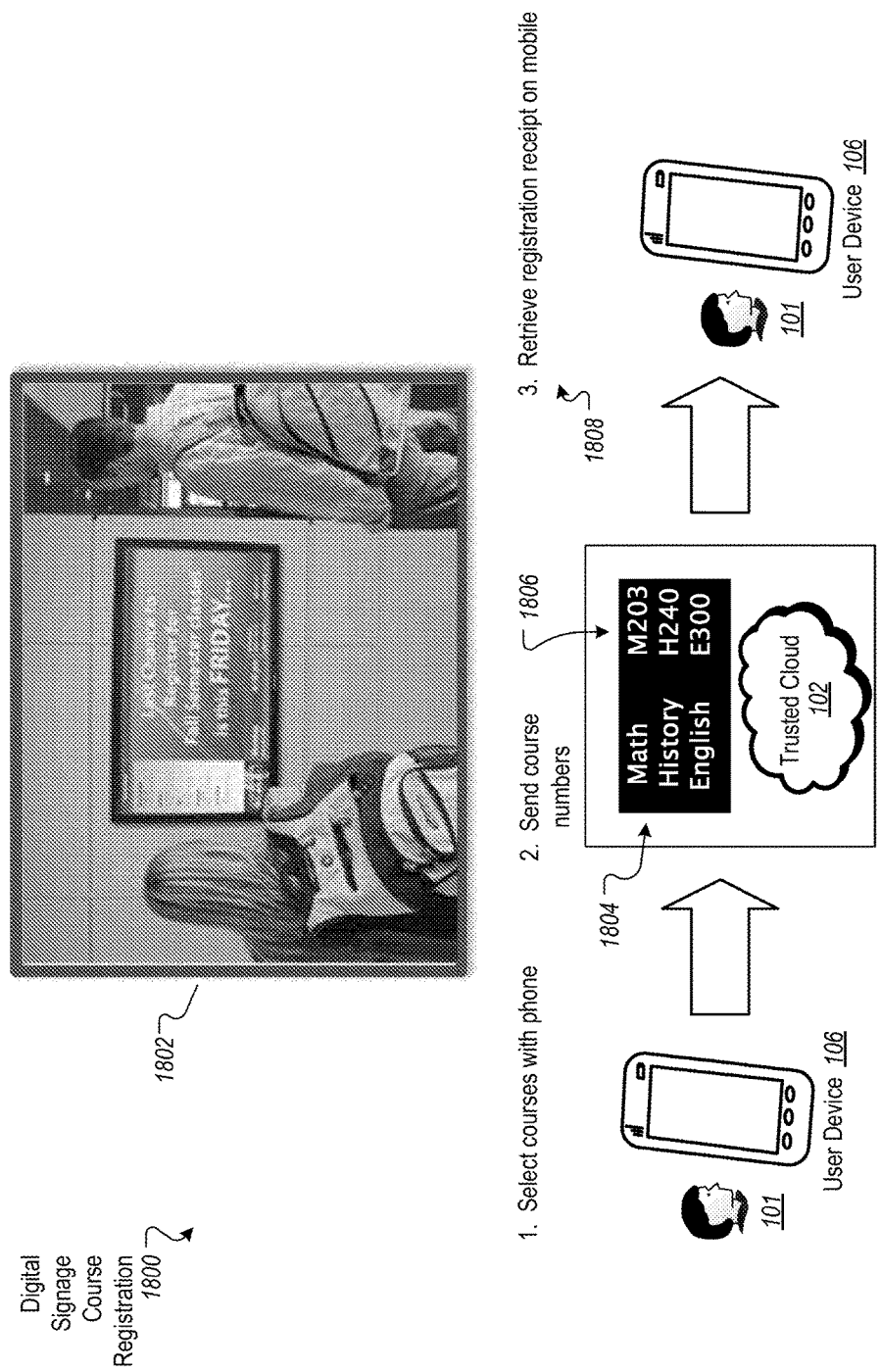
FIG. 18 shows a scenario of a digital signage course registration transaction, in accordance with an example embodiment.

FIG. 18 shows an example scenario of a digital signage course registration transaction 1800 associated with registration for a class. An advertisement 1802 displayed on electronic signage can inform a student of registration information. The student can use the mobile device 106 to select courses 1804 by entering course numbers 1806 that are sent to the trusted cloud 102 (e.g., to be provided to the university that manages or provides the course). Upon authorization of the transaction (and any applicable payments), the student can receive a registration receipt 1808 to attend the classes. In some implementations, the course numbers can be entered in an app that serves as an interface for registering for a class, or the student can send a text message that contains the codes.

Figure 19:
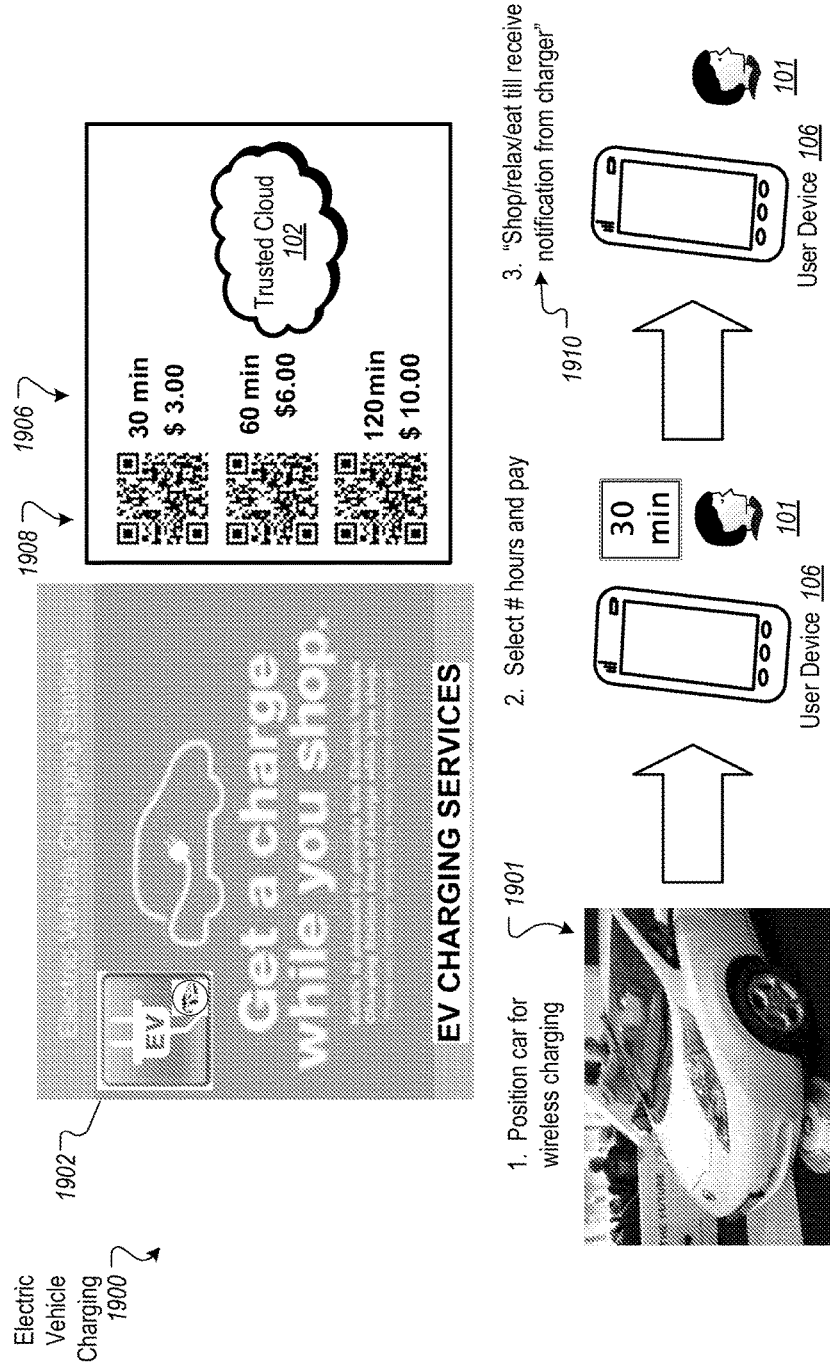
FIG. 19 shows a scenario of a transaction associated with purchasing an electric charge for an electric vehicle, in accordance with an example embodiment.

FIG. 19 shows an example scenario of a transaction 1900 associated with purchasing an electric charge for an electric vehicle. For example, upon parking the electric vehicle 1901 at a charging station, the user can read information 1902 that describes the process for requesting and paying for a charge using a mobile device and the trusted cloud 102. In this example, the user can select among three different charge durations 1906, associated with 30, 60 and 120 minutes, respectively.

To select a particular charge duration, the user can make a selection 1908, e.g., by scanning the corresponding QR code or capturing the corresponding text code and machine ID. Payment for the selected charge duration is made in the trusted cloud 102. The user can receive a notification 1910 upon completion of the charge. In this example, the codes that include the charge durations can also identify a specific one of the charging station, e.g., in a group of charging stations in one location or that differentiates the charging station from one in a different physical location. In some implementations, a code for the charging station can be entered in addition to the charge duration code.

Figure 20:
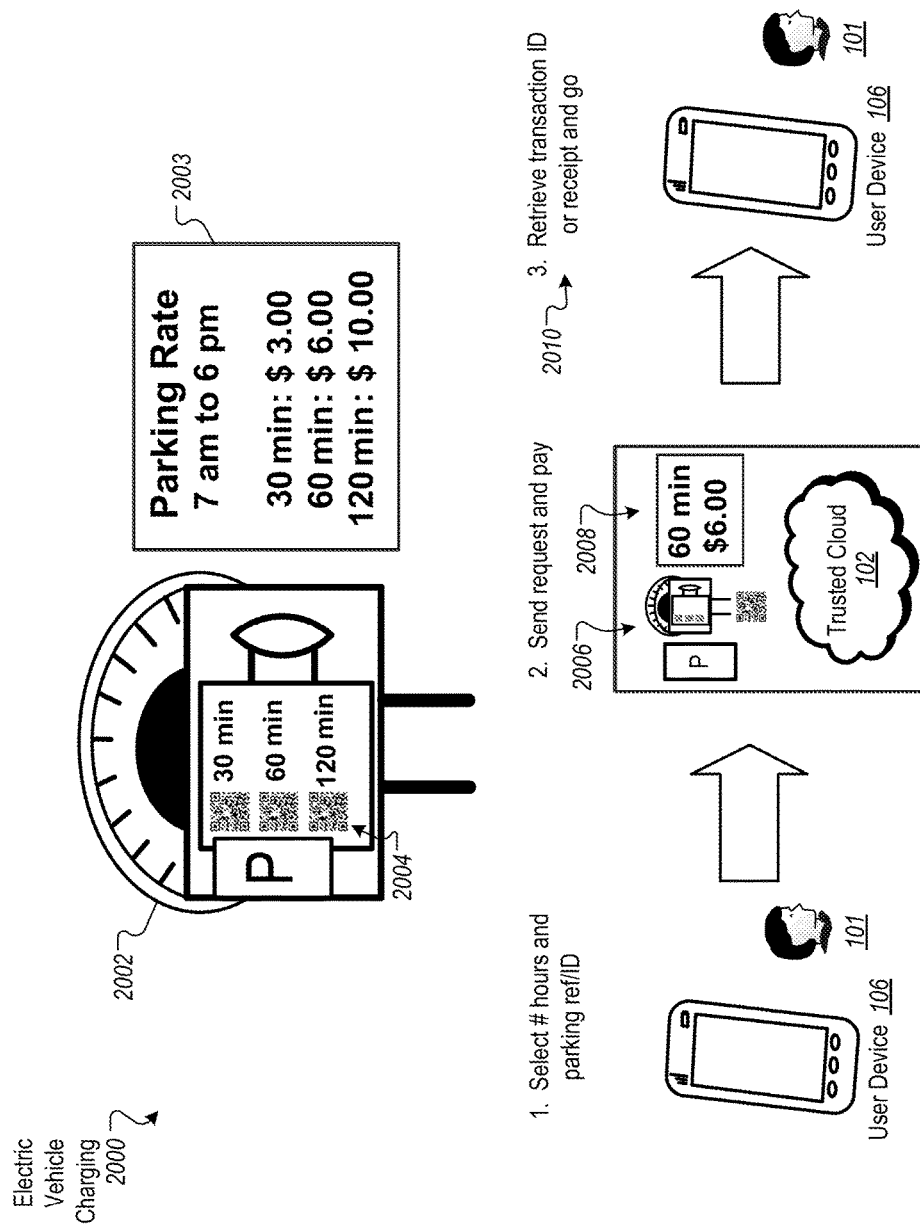
FIG. 20 shows a scenario for a transaction involving a parking meter, in accordance with an example embodiment.

FIG. 20 shows an example scenario for a transaction 2000 involving a parking meter 2002. Information 2003 that is presented on the parking meter 2002 can instruct a user to scan or select one of various QR codes 2004, each associated with a different duration of pre-paid parking. Upon the user making a selection, a transaction 2006, including a selected duration 2008, can be sent to the trusted cloud 102. Upon authorization of the transaction and completion of payment, a transaction ID and receipt 2010 can be generated for the user. In some implementations, some old non-connected parking meters (and other devices) can be characterized by an identifier. These devices will have a virtual 'connected' representation in the cloud with the same identifier as the physical (non-connected) device. This will allow a consumer, or a parking attendant in this example, to read the parking status of a parked car by checking the identifier of the physical device and being directed to the virtually connected instance of the device to retrieve the actual status of that parking slot (e.g., available, occupied since 'xx' minutes, occupied with paid parking time elapsed).

Figure 21:
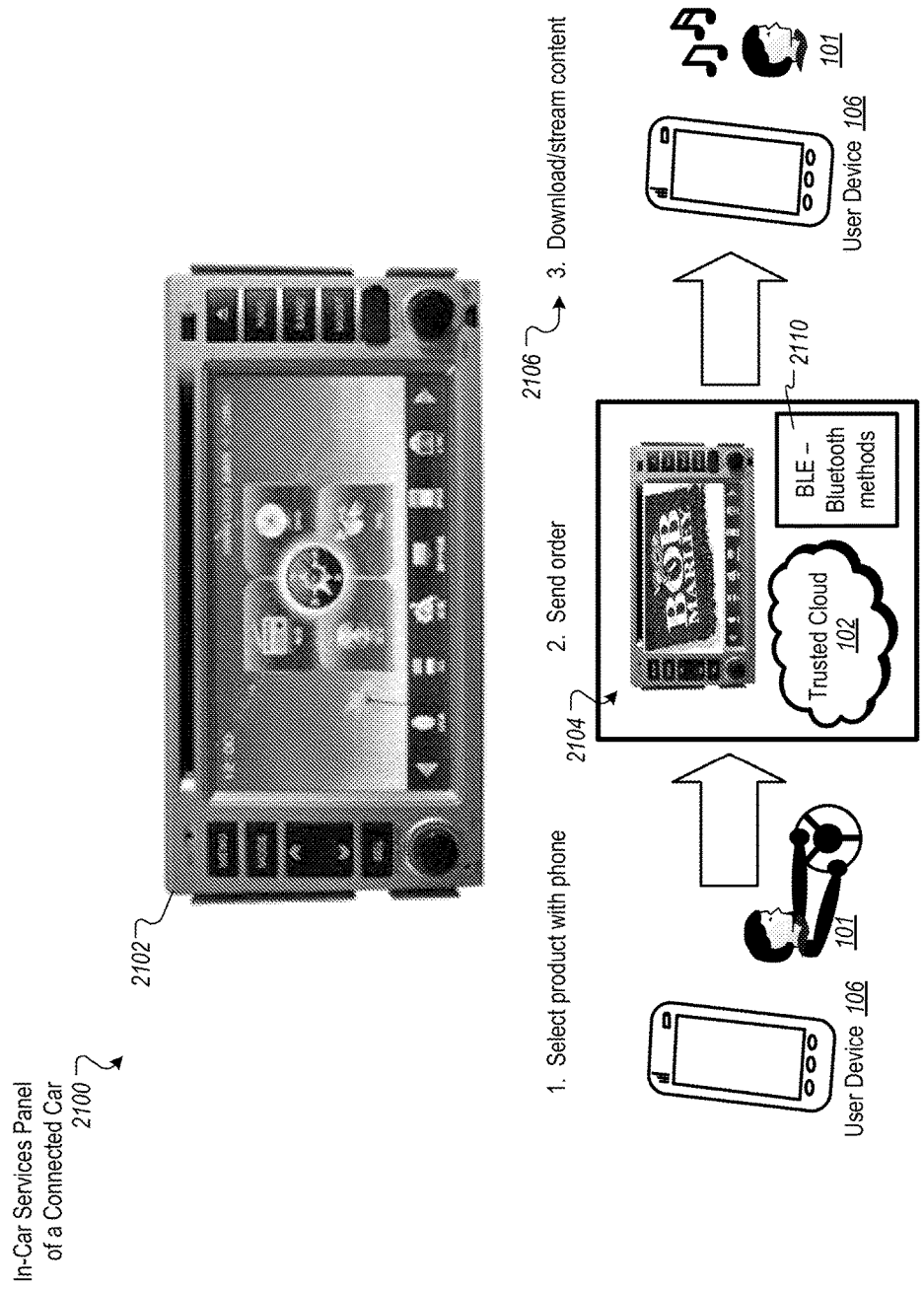
FIG. 21 shows a scenario for a transaction involving purchasing in-car services, in accordance with an example embodiment.

FIG. 21 shows an example scenario for a transaction 2100 involving purchasing in-car services. For example, the transaction 2100 can be associated with pay-per-view content to be presented on an in-car device 2102. Using information presented on the display inside the car, for example, a passenger in the car can enter or scan a code for a product 2104 (e.g., a specific movie, video, song, etc.). A transaction, including an order for the content, is sent to the trusted cloud 102. If the transaction is authorized, and upon payment, associated content 2106 can begin streaming on the in-car device 2102. Other components inside an automobile can also include machines that are connected to the trusted cloud 102 for the purpose of transactions or other uses. In some implementations, BLE-Bluetooth methods 2121 can be used to capture the product/service information from the in-car screen/panel of the connected (e.g., smartphone BLE can easily be paired with car dashboard services).

FIG. 22 is a flow chart of an example process 2200 for providing single-initiation-step transactions using a trusted cloud and connected machines. For example, process 2200 can be used for conducting a transaction involving a consumer engaged with a machine. FIGS. 1A-21 provide example structures for performing the steps of the process 2200.

At 2202, a transaction request is received that is initiated by a device associated with the consumer. The transaction request is received at a computing system having a prior registration of the consumer and a prior registration of a product or service provider associated with the engaged machine. The transaction request includes: (i) information sufficient for the computing system to identify the consumer from among all registered consumers, (ii) information sufficient for the computing system to identify the product or service provider associated with the engaged machine from among all registered product or service providers, and (iii) information obtained from the machine that is sufficient for the computing system to identify a proposed transaction between the consumer and the product or service provider.

For example, as described above, the trusted cloud 102 can receive a transaction from the user device 106, such as initiated by the user 101 who is registered in the trusted cloud 102. The interaction module 108 can use transaction information to identify the user 101 from among other users who are registered in the trusted cloud 102. For example, the user 101's phone number (included with the transaction request) can be used to identify the user 101 from a plurality of other registered users. In some implementations, the transaction information can further include information that can be used to identify the engaged machine from a plurality of engaged machines, or information that can be used to identify a particular product or service from a plurality of products or services. Referring to FIG. 14, for example, transaction information includes information that identifies beverage 1410 from among other products, including other beverages sold from the same vending machine. In another example, the transaction can instead identify a product or service identified in FIGS. 15-20.

In some implementations, the machine can be a network-connected automated retail machine, and the transaction request further includes information sufficient to identify a specific product available at the automated retail machine. For example, referring to FIG. 14, the transaction received by the trusted cloud 102 can uniquely identify the connected device 104 (e.g., a vending machine) from among hundreds or thousands of other connected devices that are associated with the same merchant or other merchants. The transaction can also identify the beverage 1410 from among all other beverages and other products that may be offered for sale by the vending machine.

In some implementations, the transaction request can further include information sufficient for the computing system to identify the engaged machine from among a plurality of machines associated with the product or service provider associated with the engaged machine, and the process 2200 can further comprise using the received engaged machine identifying information to identify the engaged machine from among the plurality of machines. For example, the trusted cloud 102 can use connected machine-related information included in the transaction to identify the particular connected device 104 (e.g., the vending machine), as described above.

In some implementations, the consumer identifying information provided in the received transaction request comprises a unique identifier for the device. For example, the transaction that is received by the trusted cloud 102 identifies the user device 106 from among other registered user devices.

At 2204, the received consumer identifying information and the received product or service provider information is used to identify the parties to the proposed transaction from among all registered consumers and all registered product or service providers. For example, the trusted cloud 102 can identify the user 101 and the merchant associated with the beverage 1410, as described above.

At 2206, an authorization process for the proposed transaction is initiated by the computing system and on behalf of the registered consumer that is a party to the proposed transaction. In response, an authorization decision result is received, wherein the authorization process for the proposed transaction is performed without further communication between the computing system and the device associated with the consumer. For example, the interaction module 108 can authorize the transaction, as described above. The authorization occurs, for example, without receiving an additional communication from the connected device 104.

In some implementations, the process 2200 can further include initiating, by the computing system, a payment process to obtain payment from an account of the consumer for the proposed transaction, wherein the payment process is performed in response to verification that the consumer is a registered user of the device and that the consumer is an account holder for the payment account. For example, a name of a user associated with a user device from which a transaction request is received can be identified. The user's name can be associated with a phone number for the transaction request, for example. A name associated with a bank account/credit card/debit card/etc. that is identified as a payment account for the transaction can also be identified. The system can then verify that the name associated with the payment account and the name associated with the user device are the same. In other words, the transaction request is verified by ensuring that the user device that initiated the transaction request and the payment account for the transaction request are registered to the same person.

For transactions involving a payment (e.g., associated with the transactions of at least FIGS. 14, 16, 19 and 20), the processing module 110 can perform processing as described above, e.g., related to one or more payments for the product (s) or service(s) associated with the particular transaction. In some implementations, the process 2200 can further include the use of a convention to group multiple product or service selections. For example, if a transaction request for a single product has a structure/syntax along the lines of: <productID>_<machineID>_<accesscode>, then a structure/syntax for a multiple product selection could be done as follows: <productID1>/<productID2>_<machineID>_<accesscode>. In some implementations, a maximum number of orders in a group can be defined by the service provider. Similarly, a QR code generated dynamically can include selections of several products or services included in one single transaction request. The above convention example of a structure/syntax is shown for illustrative purpose only, and other conventions for grouping multiple orders from same machine can be implemented. Further, the process 2200 can process QR codes that are generated dynamically by the machine, including for group selections.

In some implementations, the process 2200 can further include initiating, by the computing system and prior to receiving the transaction request, a payment validation process that includes validating a form of payment specified by the consumer, wherein the authorization process is performed responsive to the form of payment being successfully validated. For example, payment processing performed by the processing module 110 can include verifying that a payment method (e.g., credit card, etc.) designated by the user 101 (e.g., as part of a registration process) is valid and that transactions can be processed using the payment method. This verification process can occur prior to transaction requests being received from the user such that when a transaction request is received, payment authorization for the transaction request can be processed quickly and efficiently.

At 2208, if the authorization decision result indicates that the proposed transaction is authorized, an authorization communication is transmitted (e.g., for receipt by at least the engaged machine) from the computing system that authorizes the proposed transaction to be fulfilled. For example, if payment processing is completed successfully by the processing module 110, then the device management module 112 can provide a notification to the connected device 104, e.g., to authorize the dispensing of the beverage 1410.

In some implementations, the proposed transaction can include delivery of a product or performance of a service by the engaged machine, and the delivery of the product or the performance of the service by the engaged machine is initiated in response to receipt of the authorization communication by the engaged machine. For example, the transaction can be associated with any of the products or services described with reference to FIGS. 14-20. The trusted cloud 102 can authorize the delivery of the particular product or service if the parties associated with the transaction are authorized and if payment (if needed as part of the transaction) completes successfully.

In some implementations, a transaction request can be initiated when a user initiates a communication from a user device (e.g., using an app or SMS), scans or enters (or otherwise captures) product/merchant IDs and/or an access code, and transmits the request in a single step. The user's transaction request is in the carrier domain at this stage. In some implementations, a carrier authentication server authenticates the device. For example, only a valid device from an actual customer of the carrier would be accepted, and a message can be transmitted to the receiving computer system, which is in the web domain, authenticating the device. In other words, the request arriving at the receiving computer system comes from an authenticated user, which is different from conventional systems for transactions of this sort.

In some implementations, metadata that is received along with the transaction request is used to authenticate the device. Metadata can include information associated with the user device, such as a device ID for the user device or a phone number for the user device. A message (such as an SMS message) having an associated phone number can only be sent from a device that is associated with the phone number. The communications carrier (e.g., cell phone service provider) for the user device receives the transaction request from the user and provides the transaction request to the trusted cloud. The trusted cloud can authenticate the message, based on the telephone number provided by the communications carrier along with the transaction request, by identifying that the telephone number is associated with the user of the user device. This allows authorization of the transaction without further communication between the trusted cloud and the user device.

The message content, combined with data provided by the carrier after on-the-fly authentication, is sufficient and complete enough to trigger the transaction. A commerce part of the request is also included in the content of the message. The process combines device authentication performed in the carrier domain, additional multi-factor authentication, and transaction activities performed in the web domain (e.g., resulting from a single transmission request from the user). Using this process, user authentication, commerce data, and consumer data are combined in one single transmission. In some implementations, receiving computer systems can also apply several policy functions on requests of this sort, e.g., using a rich set of data about the transaction event (e.g., IDs and attributes) that have been collected before the actual payment occurs. This type of carrier authentication service can be provided, for example, by a partner of the carrier providing this service.

In some implementations, device authentication is based, at least in part, on contractual information in which the user is bound contractually with the carrier with the device. For example, the user access code can be cryptographically tied to the user device, and thus cannot be reused in another device. In some implementations, if a device is equipped with fingerprint or other biometrics technology, the user can include that method to unlock the device, and this option is an additional option to be decided upon by the user in addition to the process described above. In some implementations, tokenization can occur for the phone number itself, so that even the user's phone number does not reside in the trusted cloud.

Identity based transactions, for example, can identify the parties involved in a transaction after authentication has occurred, and enable a business interaction with or without payment (e.g., without exchanging sensitive credentials). For example, the user who initiates the transaction can be pre-registered with the trusted cloud. At the time of registration, for example, when selecting a payment method (e.g., a credit, debit or other card), the trusted cloud can request, from the payment network, "tokenized" data related to the user's payment card. This will allow the trusted cloud to use tokens instead of payment card credentials for transactions that occur in the trusted cloud. For example, when a user requests a subsequent transaction, the user's token can be sent to the payment system.

In some implementations, the following example process can occur. The user sends a request with a smartphone or other registered device and transmits a message including commerce information (e.g., product/service ID, merchant ID, etc.). The user's ID is also sent automatically as part of this transmission. The receiving computing system parses the IDs, validates the request (e.g., to identify blocked or unauthenticated users, or invalid demands are rejected), applies relevant business policies, and sends "tokenized" data related to the user account to an external payment service provider. Using the user's tokenized data, the payment request is processed, and response is sent back to receiving computing system. If the response is positive, for example, the receiving computing system has all the information needed to complete the transaction, and the merchant (e.g., connected device associated with the merchant) is instructed to release the requested product/service. If the response from the payment service provider is negative, then the transaction request is rejected.

There are advantages of this process over conventional systems. First, no user credentials are exposed, which removes vulnerability and costs/complexities associated with the handling of credentials. Second, the transaction occurs only when there exists valid identities with the presentation of identity data (e.g., without requiring credentials). Thus, this process provides an "identity-based transaction" (IBT) in which user credentials are used in the trusted cloud in a protected environment and not made visible to the merchant. Thirdly, numerous security and business policies can be applied to the various participants as their identities are known by the receiving computing system. Fourthly, the process is suitable for mobile commerce, e.g., without requiring a hardware change and/or storage of credential information in the phone. Fifthly, the process simplifies the human-machine interaction, allowing transaction to occur in a simple, secure manner with any connected machines. Interactions using this process are not limited to payment. For example, other forms of consumer engagement are also made possible with this invention, such as registrations as described above. In general, the interaction is a business application between one entity (e.g., an authenticated user) and a second entity (e.g., an authenticated connected device), both known by the receiving computing system (e.g., the trusted cloud).

In some implementations, transaction processing, such as the process 2200, can further include additional steps for communication authentication. For example, as described above with reference to FIGS. 1A-2, authorization performed by the trusted cloud 102 can use information that is shared between the carrier domain 154 for the communications carrier associated with the user device 106 and the web domain 156. Specifically, authentication can include metadata added automatically to a transaction request by the authentication carrier system 160. The metadata, for example, can include information associated with the user (e.g., user name, phone number, or tokens for the same) that further identifies the user as being an authenticated user and sender of the transaction request. During authentication, the authentication system 160 can access account information for the user 101, e.g., to verify that the user 101 and associated account are valid and/or for other purposes. In some implementations, the trusted cloud 102 can work directly with this metadata (e.g., including an authenticated device identifier) as is, or the trusted cloud 102 can receive data derived from this metadata (e.g., using a cryptographic transformation or a one-way transformation performed by the carrier or a by third-party provider) that is sent to the trusted cloud 102.

In some implementations, transaction processing can further include initiating, by the computing system, a payment process to obtain payment from an account of the consumer for the proposed transaction, wherein the payment process is performed in response to verification that the consumer is a registered user of the device and that the consumer is an account holder for the payment account. For example, the processing module 110 can perform transaction processing, including processing related to payments, for a transaction that has been authenticated by the interaction module 108, as described above.

In some implementations, the machine can be a network-connected machine that is a vending machine, kiosk, parking meter, electric vehicle charging station, digital signage, or a connected car. Other machines are possible, e.g., including rental machines, gambling/gaming devices, and other machines.

In some implementations, the engaged machine can provide a product or service identifier that is provided to the device for the transaction request. For example, engaged machines can provide a unique identifier for a product or service identified in transactions described above with reference to FIGS. 14-20. Other identifiers associated with other engaged machines are possible.

In some implementations, transaction processing, such as the process 2200, can further include the receipt of information from an automated retail machine. For example, a process can include: receiving a transaction request initiated by a device associated with the consumer, the transaction request being received at a computing system having a prior registration of the consumer and a prior registration of a product provider associated with the engaged automated retail machine, the transaction request comprising (i) information sufficient for the computing system to identify the consumer from among all registered consumers, (ii) information sufficient for the computing system to identify the product provider associated with the engaged automated retail machine from among all registered product providers, (iii) information obtained from the engaged automated retail machine that is sufficient for the computing system to identify a proposed transaction between the consumer and the product provider, and (iv) information obtained from the automated retail machine that is sufficient for the computing system to identify a product to be provided as part of the proposed transaction from among a plurality of products available at the engaged automated retail machine; using the received consumer identifying information and the received product provider information to identify the parties to the proposed transaction from among all registered consumers and all registered product providers; initiating, by the computing system and on behalf of the registered consumer that is a party to the proposed transaction, an authorization process for the proposed transaction, and, in response, receiving an authorization decision result; and if the authorization decision result indicates that the proposed transaction is authorized, transmitting an authorization communication from the computing system that authorizes the proposed transaction to be fulfilled, the authorization communication including information that is sufficient for the engaged automated retail machine to identify the product to be provided as part of the proposed transaction. For example, the information obtained from the automated retail machine that is sufficient for the trusted cloud 102 to identify a product can be an identifier for the beverage 1410 that is received from the vending machine.

In some implementations, the process 2200 includes a payment process to obtain payment from an account of the consumer for the proposed transaction, wherein the payment process is performed in response to verification that the consumer is a registered user of the device and that the consumer is an account holder for the payment account.

In some implementations, transaction processing can further include, prior to transmitting the authorization communication, determining that the engaged automated retail machine is able to perform the proposed transaction, including dispensing the product to be provided as part of the proposed transaction, wherein the authorization communication is transmitted in response to determining that the engaged automated retail machine is able to perform the proposed transaction. For example, the trusted cloud 102 can communicate with the connected machine 104 to determine that the beverage 1410 is ready to be dispensed.

In some implementations, the consumer identifying information provided in the received transaction request comprises a service provider number for the device. As an example, the interaction module 108 can identify a specific service provider 208a-208n identified from information in the received transaction for use in completing the transaction.

Figure 23:
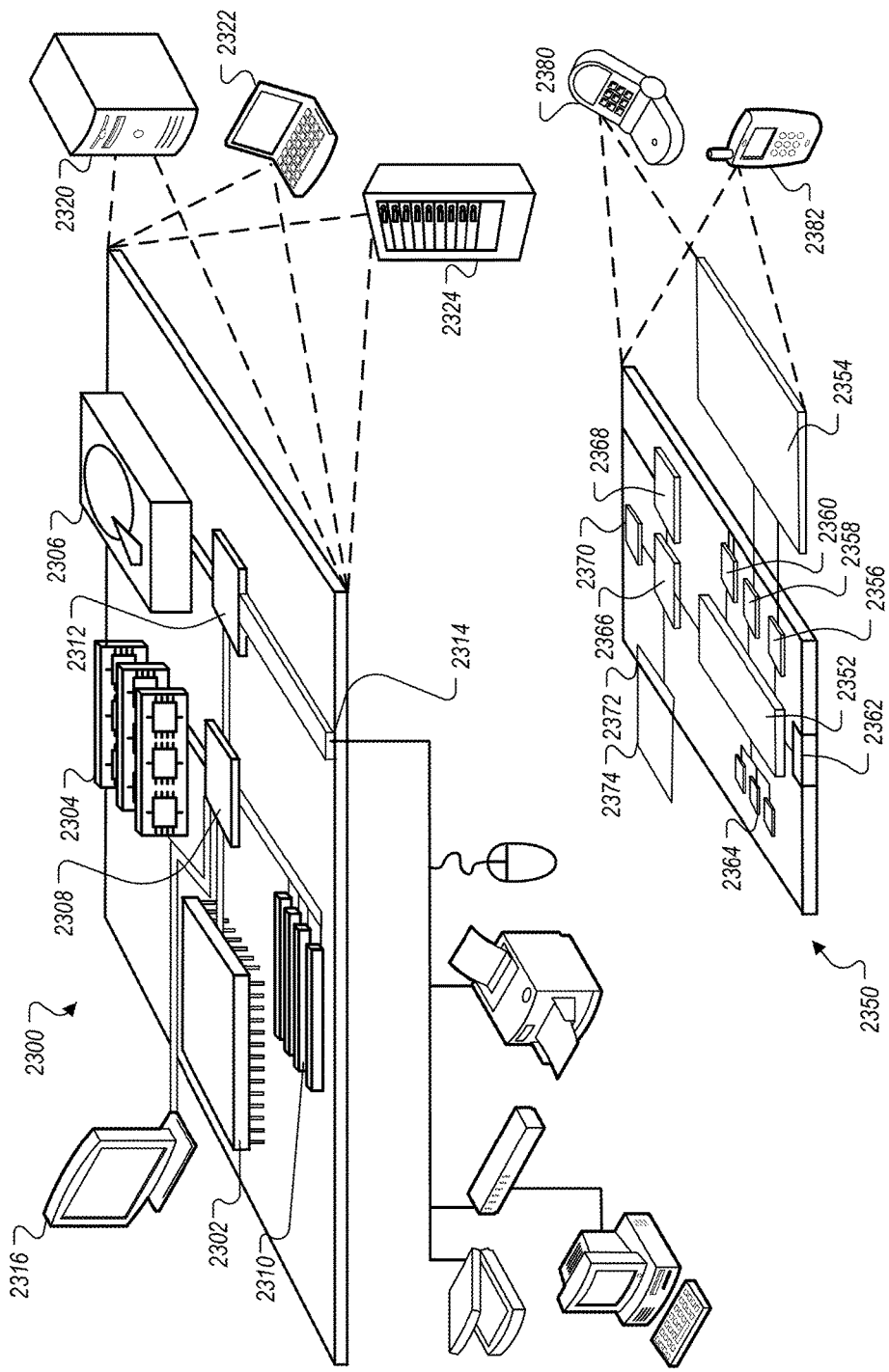
FIG. 23 is a block diagram of a computer system that can be used to implement the methods, systems and processes described in this disclosure, in accordance with an example embodiment.

FIG. 23 is a block diagram of example computing devices 2300, 2350 that may be used to implement the systems and methods described in this document, as either a client or as a server or plurality of servers. Computing device 2300 is intended to represent various forms of digital computers, such as laptops, desktops, workstations, personal digital assistants, servers, blade servers, mainframes, and other appropriate computers. Computing device 2300 is further intended to represent any other typically non-mobile devices, such as televisions or other electronic devices with one or more processors embedded therein or attached thereto. Computing device 2350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 2300 includes a processor 2302, memory 2304, a storage device 2306, a high-speed controller 2308 connecting to memory 2304 and high-speed expansion ports 2310, and a low-speed controller 2312 connecting to low-speed bus 2314 and storage device 2306. Each of the components 2302, 2304, 2306, 2308, 2310, and 2312, are interconnected using various busses, and may be mounted on a common motherboard or in other manners as appropriate. The processor 2302 can process instructions for execution within the computing device 2300, including instructions stored in the memory 2304 or on the storage device 2306 to display graphical information for a graphical user interface (GUI) on an external input/output device, such as display 2316 coupled to high-speed controller 2308. In other implementations, multiple processors and/or multiple buses may be used, as appropriate, along with multiple memories and types of memory. Also, multiple computing devices 2300 may be connected, with each device providing portions of the necessary operations (e.g., as a server bank, a group of blade servers, or a multiprocessor system).

The memory 2304 stores information within the computing device 2300. In one implementation, the memory 2304 is a computer-readable medium. In one implementation, the memory 2304 is a volatile memory unit or units. In another implementation, the memory 2304 is a non-volatile memory unit or units.

The storage device 2306 is capable of providing mass storage for the computing device 2300. In one implementation, the storage device 2306 is a computer-readable medium. In various different implementations, the storage device 2306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2304, the storage device 2306, or memory on processor 2302.

The high-speed controller 2308 manages bandwidth-intensive operations for the computing device 2300, while the low-speed controller 2312 manages lower bandwidth-intensive operations. Such allocation of duties is an example only. In one implementation, the high-speed controller 2308 is coupled to memory 2304, display 2316 (e.g., through a graphics processor or accelerator), and to high-speed expansion ports 2310, which may accept various expansion cards (not shown). In the implementation, low-speed controller 2312 is coupled to storage device 2306 and low-speed bus 2314. The low-speed bus 2314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

2312 is coupled to storage device 2306 and low-speed bus 2314. The low-speed bus 2314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 2300 may be implemented in a number of different forms, as shown in the figure. For example, it may be implemented as a standard server 2320, or multiple times in a group of such servers. It may also be implemented as part of a rack server system 2324. In addition, it may be implemented in a personal computer such as a laptop computer 2322. Alternatively, components from computing device 2300 may be combined with other components in a mobile device (not shown), such as computing device 2350. Each of such devices may contain one or more of computing devices 2300, 2350, and an entire system may be made up of multiple computing devices 2300, 2350 communicating with each other.

Computing device 2350 includes a processor 2352, memory 2364, an input/output device such as a display 2354, a communication interface 2366, and a transceiver 2368, among other components. The computing device 2350 may also be provided with a storage device, such as a micro-drive or other device, to provide additional storage. Each of the components 2350, 2352, 2364, 2354, 2366, and 2368, are interconnected using various buses, and several of the components may be mounted on a common motherboard or in other manners as appropriate.

The processor 2352 can process instructions for execution within the computing device 2350, including instructions stored in the memory 2364. The processor may also include separate analog and digital processors. The processor may provide, for example, for coordination of the other components of the computing device 2350, such as control of user interfaces, applications run by computing device 2350, and wireless communication by computing device 2350.

Processor 2352 may communicate with a user through control interface 2358 and display interface 2356 coupled to a display 2354. The display 2354 may be, for example, a TFT LCD display or an OLED display, or other appropriate display technology. The display interface 2356 may comprise appropriate circuitry for driving the display 2354 to present graphical and other information to a user. The control interface 2358 may receive commands from a user and convert them for submission to the processor 2352. In addition, an external interface 2362 may be provided in communication with processor 2352, so as to enable near area communication of computing device 2350 with other devices. External interface 2362 may provide, for example, for wired communication (e.g., via a docking procedure) or for wireless communication (e.g., via Bluetooth® or other such technologies).

The memory 2364 stores information within the computing device 2350. In one implementation, the memory 2364 is a computer-readable medium. In one implementation, the memory 2364 is a volatile memory unit or units. In another implementation, the memory 2364 is a non-volatile memory unit or units. Expansion memory 2374 may also be provided and connected to computing device 2350 through expansion interface 2372, which may include, for example, a subscriber identification module (SIM) card interface. Such expansion memory 2374 may provide extra storage space for computing device 2350, or may also store applications or other information for computing device 2350. Specifically, expansion memory 2374 may include instructions to carry out or supplement the processes described above, and may include secure information also. Thus, for example, expansion memory 2374 may be provide as a security module for computing device 2350, and may be programmed with instructions that permit secure use of computing device 2350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2364, expansion memory 2374, or memory on processor 2352.

Computing device 2350 may communicate wirelessly through communication interface 2366, which may include digital signal processing circuitry where necessary. Communication interface 2366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 2368 (e.g., a radio-frequency transceiver). In addition, short-range communication may occur, such as using a Bluetooth®, Wifi, or other such transceiver (not shown). In addition, GPS receiver module 2370 may provide additional wireless data to computing device 2350, which may be used as appropriate by applications running on computing device 2350.

Computing device 2350 may also communicate audibly using audio codec 2360, which may receive spoken information from a user and convert it to usable digital information. Audio codec 2360 may likewise generate audible sound for a user, such as through a speaker, e.g., in a handset of computing device 2350. Such sound may include sound from voice telephone calls, may include recorded sound (e.g., voice messages, music files, etc.) and may also include sound generated by applications operating on computing device 2350.

Computing device 2350 may be implemented in a number of different forms, as shown in the figure. For example, it may be implemented as a cellular telephone 2380. It may also be implemented as part of a smartphone 2382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Using features of the embodiments described above, further embodiments involving secure and anonymized authentication may be employed. In particular, these further embodiments improve the security of transactions between a device and a machine, and do not require that information identifying the device (or user thereof) is disclosed to the machine.

In the discussion below, a "client device" may refer to any type of "user device" described above (e.g., user device 106). However, devices that are not associated with a particular user may also be considered to be a "client device." A "remote machine" may refer to any type of "connected device," "connected machine," "IOT device," or "IOT machine" described above (e.g., connected machine 152). Further, a "computing system" may include one or more computing devices configured as part of a trusted cloud infrastructure.

Additionally, the embodiments described below may incorporate any or all of the features, operations, functions, components, or structural aspects described in the context of FIGS. 1-23 above. Thus, for instance, a "client device" may be exemplified by computing device 2350, and a "computing system" may include one or more of computing device 2300.

Figure 24:
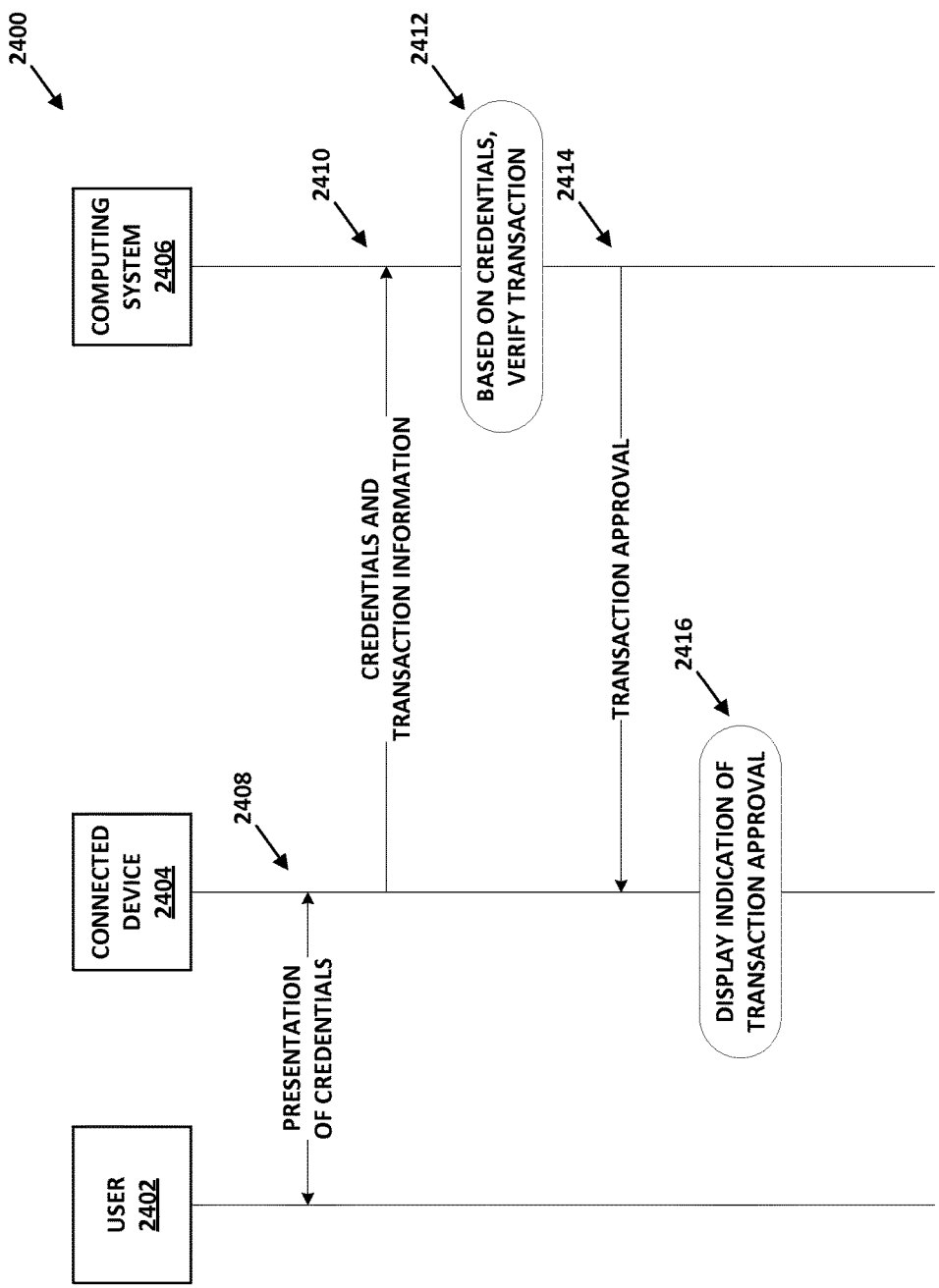
FIG. 24 is a message flow diagram, in accordance with an example embodiment.

FIG. 24 depicts an example transaction 2400 between user 2402 (or a client device associated with user 2402), connected device 2404, and computing system 2406. Transaction 2400 may represent a credit card payment transaction, a parking meter payment transaction, or any similar transaction, such as those of FIGS. 14-21.

At step 2408 of FIG. 24, user 2402 presents credentials to connected device 2404. This step may involve swiping of a credit card or access card, entry of information from such a card, or some other mechanism. User 2402, or some other party, may indicate to connected device 2404 other details regarding the transaction, such as a location, payment information, an identity of user 2402, and so on. At step 2410, connected device 2404 reads the credentials, and transmits the credentials and any of the other details to computing system 2406.

At step 2412, computing system 2406 verifies the transaction based on the credentials (and possibly other information). At step 2414, computing system 2406 transmits approval of the transaction to connected device 2404. At step 2416, connected device 2404 may indicate that the transaction has been approved. For example, this indication may involve connected device 2404 displaying information, or otherwise changing state.

There are a number of vulnerabilities associated with transaction 2400 or any similar transaction. For instance, when user 2402 presents credentials to connected device 2404, these credentials may be observed by other parties who could later use the credentials in a fraudulent transaction. Additionally, the credentials may be stored in connected device 2404 for some period of time, making connected device 2404 a target for being compromised either physically or electronically. Moreover, a representation of the credentials may be stored in computing system 2406, again providing a target for comprise.

If user 2402 stores the credentials on a client device, such as a smartphone, this platform may be vulnerable to malware and/or spyware applications designed to capture either the stored credentials, or credentials entered into the device. In some cases, the malware and/or spyware can be embedded inside legitimate applications, which makes detection of this problematic software difficult.

On top of concerns regarding the security of the credentials, this transaction identifies user 2402, either by use of the credentials or other PII. Thus it lacks privacy. Even if the credentials are not compromised, connected device 2404 and/or computing system 2406 may maintain records of the transaction, and these records may identify user 2402.

Data security is a growing concern, as large-scale security breaches of credit card information, personal information, and other user account information is unfortunately becoming commonplace. The embodiments of FIGS. 25 and 26 mitigate at least some of risks associated with transactions such as transaction 2400 by providing secure and anonymized authentication.

Figure 25:
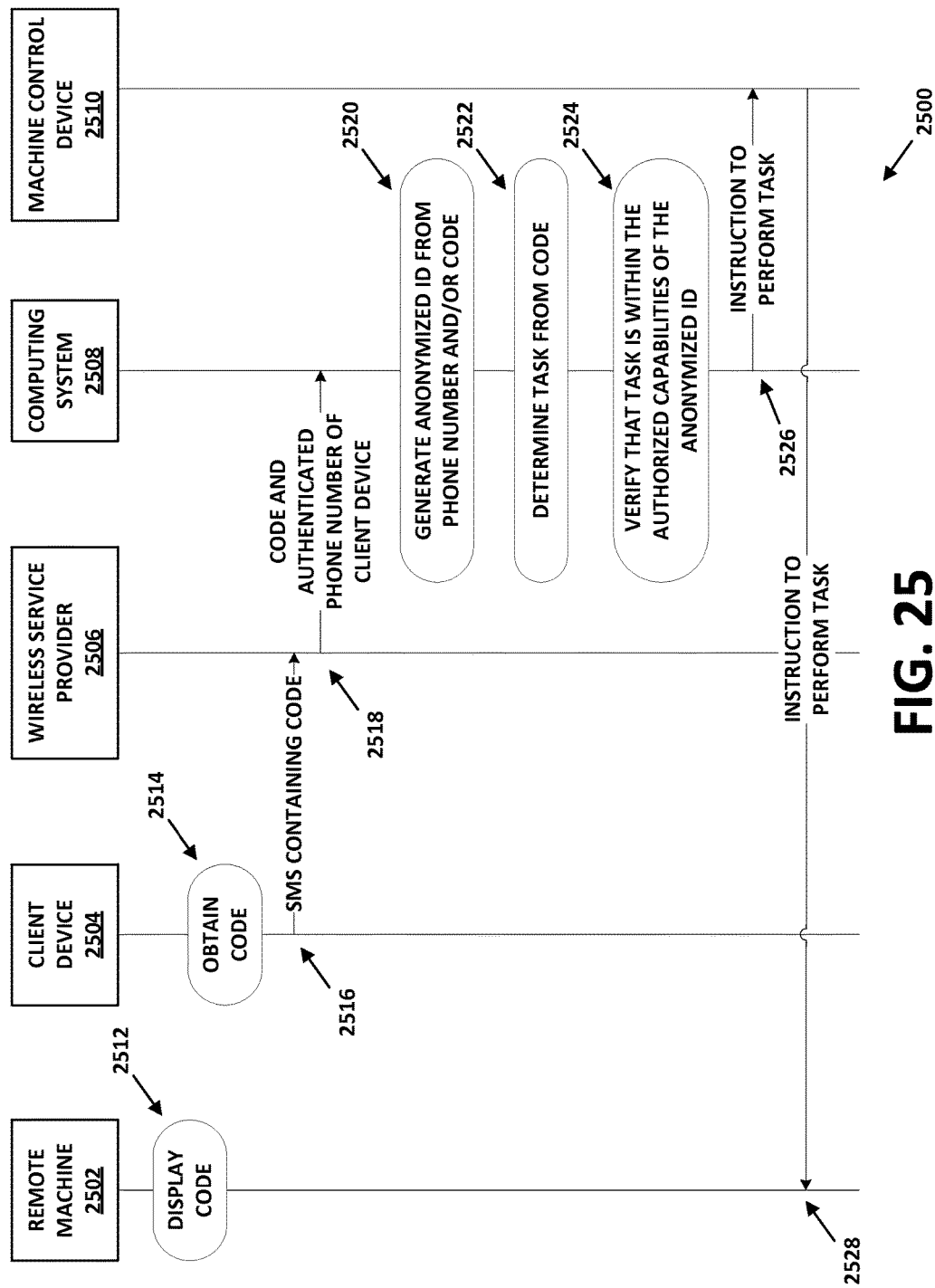
FIG. 25 is another message flow diagram, in accordance with an example embodiment.
Figure 26:
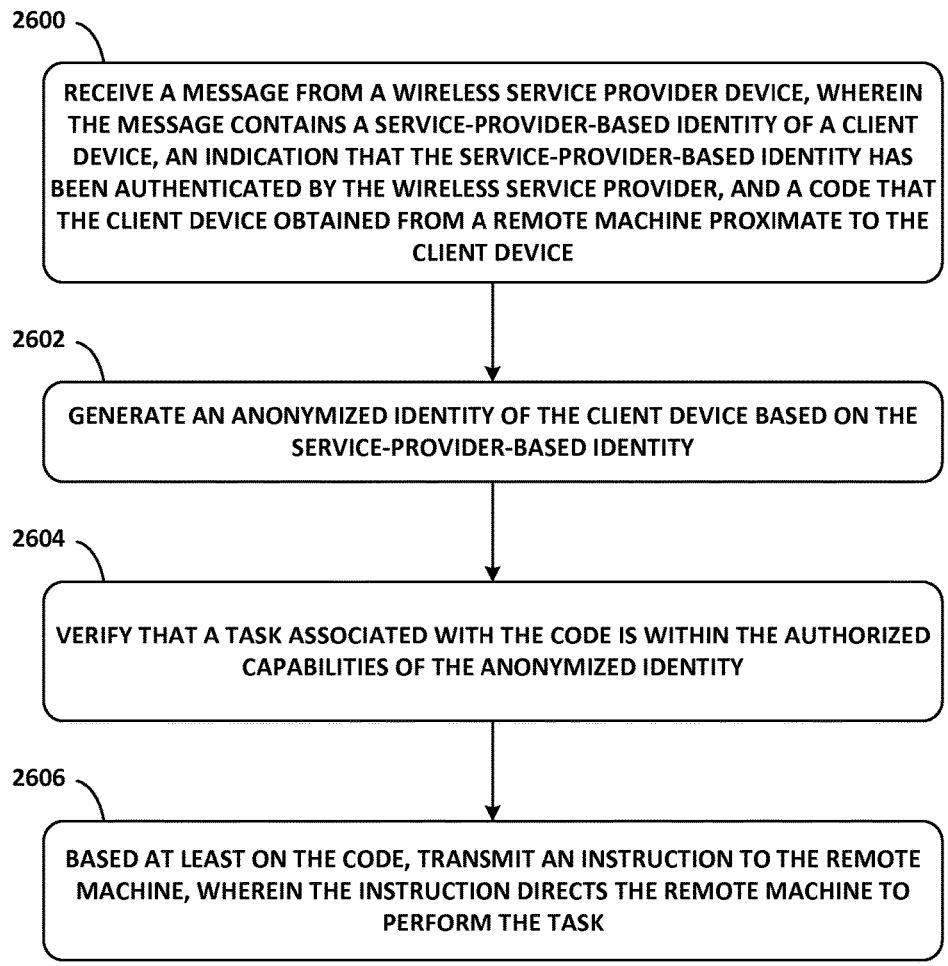
FIG. 26 is a flow chart, in accordance with an example embodiment.

Although not shown in FIG. 25 or 26, these embodiments may involve client device 2504, or a user thereof, pre-registering with computing system 2508. This registration may include establishment of an anonymized identity for client device 2504 (see below for details). Also, an account for client device 2504 may be established, where this account is indexed by the anonymized identity. Thus, the anonymized identity may have been created during the account registration process for client device 2504. See FIG. 5 and its accompanying text for one possible example thereof.

FIG. 25 depicts example transaction 2500. In this transaction, client device 2504 may be proximate to a remote machine 2502. Client device 2504 may also be served by wireless service provider 2506. In some examples, client device 2504 may be a smartphone and wireless service provider 2506 may be a cellular service provider to which client device 2504 is subscribed. Alternatively, client device 2504 may be an autonomous or semi-autonomous machine-to-machine (M2M) device equipped with an M2M modem for communicating with wireless service provider 2506. Transaction 2500 also involves computing system 2508 and optionally machine control device 2510.

At step 2512, remote machine 2502 may display a code. This code may take various forms, such as an alphanumeric code, QR code, barcode, or image. Regardless of its exact form, the code may identify remote machine 2502 and/or represent a task that remote machine 2502 can perform on behalf of client device 2504.

For instance, remote machine 2502 may be a parking meter at which the user of client device 2504 is attempting to park a car, and the code may represent the location of the parking meter and the cost of parking for a given duration. Alternatively, remote machine may be or control a door lock of a secured facility to which the user of client device 2504 is attempting to gain access, and the code may represent the door lock. In another alternative, remote machine 2502 may be a vending machine from which the user to client device 2504 is attempt to obtain an item, and the code may represent the vending machine and the item. Other possibilities exist.

In any case, at step 2514, client device 2504 may obtain the code. In some situations, the code (if it is alphanumeric for instance) may be manually entered into client device 2504. In other situations, client device 2504 may scan or otherwise capture an image of the code. For instance, an application operating on client device 2504 may operate a camera integrated into client device 2504 to capture a representation of the code.

Once the code is obtained, at step 2516 client device 2504 may transmit a representation of the code to wireless service provider 2506. One possible way of doing so is for client device 2504 to transmit an SMS or MMS message containing the code to a particular recipient. For instance, remote machine 2502 may display a message stating, "For more information, text the numbers 1234 to 8475551212." As noted above, this information may be manually entered into client device 2504 (e.g., into a text messaging application operating on client device 2504). On the other hand, the code and recipient may be encoded into an image, such as a QR code. An application operating on client device 2504 may obtain the image, determine the code and recipient therefrom, and transmit the message of step 2516 accordingly. In some cases, client device may encrypt or otherwise obscure the code in the message so that wireless service provider 2506 is unable to read it.

As part of the process of communicating with a subscriber such as client device 2504, wireless service provider 2506 may carry out strong two-way authentication with client device 2504. In this way, client device 2504 authenticates itself to wireless service provider 2506 and vice versa. Further, all communications that client device 2504 sends or receives via wireless service provider 2506 may be protected by strong encryption. As a result, the message transmitted by client device 2504 at step 2516 accurately identifies client device 2504 and protects the contents thereof.

Therefore, at step 2518, wireless service provider 2506 may transmit a further message to computing system 2508. This message may contain an identifier of client device 2504, such as a phone number obtained from the message of step 2516, an indication that this identifier is authenticated, and the code.

At step 2520, computing system 2508 may generate an anonymized identifier from the identifier of step 2518. For instance, computing system 2508 may apply a one-way function, such as a one-way hash or a tokenization of the identifier. In an example, assuming that the identifier of step 2518 is a phone number, computing system may apply Secure Hash Algorithm 3 (SHA-3) to the phone number, resulting in a hashed representation thereof. Other information may be used as input to the hash, such as the identity of remote machine 2502, the identity of an operator of remote machine 2502, location of remote machine 2502, a business entity or person operating remote machine 2502, part or all of the code, and/or other information. Also, if the code was encrypted at or prior to step 2516, it may be decrypted at step 2520.

At step 2522, computing system 2508 may determine, from the code, the task that remote machine 2502 has been requested to perform on behalf of client device 2504. In some examples, computing system 2508 may have access to a database mapping codes or parts of codes to tasks. Thus, computing system 2508 may look up the code or a part of the code in this database to determine the task.

At step 2524, computing system 2508 verifies that the task is within the authorized capabilities of the anonymized identifier. For instance, if the task is validation of a payment, computing system 2508 may verify that the account associated with client device 2504 has sufficient funds to cover the payment. Or, if the task is the unlocking of a door at a secure facility, computing system 2508 may verify that a user associated with the anonymized identity is permitted into the facility at the current time and by way of the door. Other possibilities exist.

Assuming that step 2524 is successful, computing system 2508 may transmit an instruction to remote machine 2502 to perform the task on behalf of client device 2504. In some cases, this may involve computing system 2508 directly communicating with remote machine 2502. In the scenario illustrated by FIG. 25, on the other hand, at step 2526 computing system 2508 transmits an instruction to perform the task to machine control device 2510. Then, at step 2528, machine control device 2510 transmits this instruction to remote machine 2502.

In some deployments, steps 2526 and/or 2528 may involve transmitting the same instruction or similar instructions to multiple remote machines. Or, either or both of these steps may involve transmitting different instructions to different remote machines. For instance, if specific activities of two machines need to be triggered for the task to be carried out, instructions may be transmitted to these two machines so that they may collectively perform the task.

A possible advantage to relaying the instruction through machine control device 2510 is to logically separate the operations of steps 2520, 2522, 2524, and 2526 from that of locating and addressing remote machine 2502. Since there may be thousands or millions of remote machines in an IOT network, it can be efficient for one or more remote machine control devices to manage and/or mediate communications with these machines. In some embodiments, machine control device 2510 may be a separate physical device from remote machine 2502, and in others machine control device 2510 may be a controller integrated into machine control device 2510.

While FIG. 25 depicts a client device, such as a wireless computing device, having its phone number authenticated by a wireless service provider, other options are possible. For instance, any type of computing device or component (e.g., a laptop computer, desktop computer, smart card, etc.), may be associated with any type of identifier. This identifier may be authenticated by any trusted third party. For instance, a desktop computer may be associated with a digital certificate, and this digital certificate may be authenticated by a certificate authority rather than a wireless service provider.

In any event, the out-of-band transaction 2500, which limits the direct communication between client device 2504 and remote machine 2502, has a number of advantages over the in-band transaction 2400 in which these elements must interact closely. Notably, the actual credentials of client device 2504 (e.g., a credit card or account number) are not revealed to remote machine 2502, wireless service provider 2506, or machine control device 2510, reducing opportunities for other parties acquiring these credentials. For instance, if remote machine 2502, wireless service provider 2506, or machine control device 2510 are compromised, the credentials of 2504 cannot be determined.

Further, PII associated with client device 2504 is not revealed to remote machine 2502, wireless service provider 2506, or machine control device 2510. Particularly, remote machine 2502 is only aware that it was asked to perform a task on behalf of some client device or party, and then it was instructed to carry out that task. If remote machine 2502 is compromised, no information about client device 2504 is revealed. On the other hand, if an audit of the tasks performed by remote machine 2502 on behalf of client devices is needed, this information can be obtain by way of computing system 2508.

Additionally, anonymized identities can be discarded and regenerated at a very low cost. This further reduces the risk associated with their use. In comparison, user credentials that have practically no usage limit carry a much higher risk if stolen.

Further, even if client device 2504 is lost by or stolen from its legitimate user, the ability of an unauthorized party to fraudulently use this device is limited. For instance, a lock screen function may require that the user enter a PIN, code, fingerprint or other information before any further access to client device 2504 is permitted. Additionally, any application used to capture an image of the code may also require entry of a passcode before use. But even if an unauthorized party is able to access the full functionality of client device 2504, the legitimate user can easily deactivate client device 2504 by informing wireless service provider 2506. As such, step 2518 and any steps following will not take place because authentication of client device 2504 with wireless service provider 2506 will fail.

An example of transaction 2500 for unlocking a door to provide access to a secure facility is as follows. A user carrying client device 2504 (e.g., a smartphone) may approach remote machine 2502. Remote machine 2502 may include a display associated with the locked door. Perhaps after the user enters a request for access in remote machine 2502, remote machine 2502 may display a QR code. The QR code may encode an identity of remote machine 2502 and the request for access to the locked door.

The user captures the QR code with an application operating on client device 2504. The application automatically processes this code (perhaps converting it to an alphanumeric sequence) to determine the identity of remote machine 2502 and that unlocking the door is being requested. The application then generates an SMS message containing this information and transmits the message to wireless service provider 2506. In some embodiments, instead of an SMS message, an Unstructured Supplementary Service Data (USSD) message, or some other peer-to-peer message, instant message, or client/server message (e.g., an HTTP request) may be used instead. Other types of messages and/or signaling protocols may be used as well.

From the message, wireless service provider determines the phone number of client device 2504. Wireless service provider 2506 then authenticates client device 2504 and its phone number, and transmits a further message to computing system 2508 containing the phone number, an indication that the phone number is authenticated, and the code. Computing system 2508 generates an anonymized identity from the phone number and/or code, determines that the task to be performed is unlocking the door, and verifies that the anonymized identity of client device 2504 is authorized to access the secure facility. Computing system 2508 then transmits an instruction to unlock the door to machine control device 2510. Machine control device 2510 locates remote machine 2502, and forwards the instruction to remote machine 2502. Remote machine 2502 then unlocks the door.

FIG. 26 is a flow chart illustrating an example embodiment. The process illustrated by FIG. 26 may be carried out by a computing device or system, such as computing system 2508. However, the process may be carried out by other types of devices or device subsystems.

At block 2600, a computing system may receive a message from a wireless service provider system. The message may contain a service-provider-based identity of a client device, an indication that the service-provider-based identity has been authenticated by the wireless service provider, and a code that the client device obtained from a remote machine proximate to the client device. The code may include a first sub-code that identifies the remote machine and a second sub-code that identifies the task. The wireless service provider system may be associated with a cellular wireless service provider serving the client device, and the service-provider-based identity may be a cellular phone number of the client device. In some embodiments, the wireless service provider system may be a particular wireless service provider sub-system or device, such as a server, a database, a billing sub-system, an authentication, authorization, and accounting sub-system, or an application programming interface accessible by way of such a sub-system or device. Communication between the wireless service provider system and the computing system may take place over any applicable signaling protocol, such as the Session Initiation Protocol (SIP), DIAMETER, etc. In other embodiments, the wireless service provider system may be replaced with a system, sub-system, or device of any other type of entity that can authenticate that the message came from the client device.

At block 2602, the computing system may generate an anonymized identity of the client device based on the service-provider-based identity. The anonymized identity may be based on a one-way function of the service-provider-based identity. The anonymized identity may also be based on the code and/or one or more of an entity, a location, or a type of transaction provided by the remote machine. The entity may be, for instance, a governmental identity, a commercial identity, a business (for profit or not for profit), a partnership, a person, a group, and so on. The computing system may be configured to generate different anonymized identities for the client device based on respective codes that the client device receives from respective remote machines.

At block 2604, the computing system may verify that a task associated with the code is within the authorized capabilities of the anonymized identity. Further, the computing system may have access to a database associating anonymized identities with respective capabilities. Verifying that the task associated with the code is within the authorized capabilities of the anonymized identity may involve looking up the anonymized identity in the database to determine associated capabilities, and determining that the associated capabilities indicate that the anonymized identity is permitted to cause the remote machine to perform the task.

At block 2606, possibly based at least on the code, the computing system may transmit an instruction to the remote machine. The instruction may direct the remote machine to perform the task. Transmitting the instruction to the remote machine may involve transmitting the instruction to a machine control device that controls the remote machine. The instruction may also be based on the anonymized identity.

In some embodiments, before receiving the message, the computing system may register the client device. The registration may involve determining the anonymized identity of the client device, and associating the anonymized identity with other credentials of the client device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, other implementations of the described subject matter are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Consequently, the present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A method comprising:
receiving, by a computing system, a message from a wireless service provider system, wherein the message contains a service-provider-based identity of a client device, an indication that the service-provider-based identity has been authenticated by the wireless service provider, and a single code that the client device obtained from a portal device proximate to the client device, wherein the portal device is in a locked state, and wherein the code includes a first sub-code that identifies the portal device and a second sub-code that identifies a task of unlocking the portal device;
generating, by the computing system, an anonymized identity of the client device based on the service-provider-based identity, wherein the anonymized identity is generated by applying a one-way function to the service-provider-based identity and the code, wherein the computing system is configured to generate different anonymized identities for the client device based on respective codes that the client device receives from respective remote machines, and wherein the portal device is one of the remote machines;
based on the code and the anonymized identity, verifying, by the computing system, that unlocking the portal device is within the authorized capabilities of the anonymized identity; and
transmitting, by the computing system, an instruction to the portal device, wherein the instruction causes the portal device to change from the locked state to an unlocked state.

2. The method of claim 1, wherein the wireless service provider system is associated with a cellular wireless service provider serving the client device, and wherein the service-provider-based identity is a cellular phone number of the client device.

3. The method of claim 1, wherein the computing system has access to a database associating anonymized identities with respective capabilities, and wherein verifying that unlocking the portal device is within the authorized capabilities of the anonymized identity comprises:
looking up the anonymized identity in the database to determine associated capabilities; and
determining that the associated capabilities indicate that the anonymized identity is permitted to cause the portal device to change from the locked state to the unlocked state.

4. The method of claim 1, wherein the anonymized identity is also based on one or more of an entity, a location, or a type of transaction provided by the portal device.

5. The method of claim 1, wherein transmitting the instruction to the portal device comprises transmitting the instruction to a machine control device that controls the portal device, wherein the machine control device causes the portal to change from the locked state to the unlocked state.

6. The method of claim 1, wherein the instruction is also based on the anonymized identity.

7. The method of claim 1 further comprising:
before receiving the message, registering, by the computing system, the client device, wherein the registration involves determining the anonymized identity of the client device, and associating the anonymized identity with other credentials of the client device.

8. An article of manufacture including a non-transitory computer-readable medium, having stored thereon program instructions that, upon execution by a computing system, cause the computing system to perform operations comprising:
receiving a message from a wireless service provider system, wherein the message contains a service-provider-based identity of a client device, an indication that the service-provider-based identity has been authenticated by the wireless service provider, and a single code that the client device obtained from a portal device proximate to the client device, wherein the portal device is in a locked state, and wherein the code includes a first sub-code that identifies the portal device and a second sub-code that identifies a task of unlocking the portal device;
generating an anonymized identity of the client device based on the service-provider-based identity, wherein the anonymized identity is generated by applying a one-way function to the service-provider-based identity and the code, wherein the computing system is configured to generate different anonymized identities for the client device based on respective codes that the client device receives from respective remote machines, and wherein the portal device is one of the remote machines;
based on the code and the anonymized identity, verifying that unlocking the portal device is within the authorized capabilities of the anonymized identity; and
transmitting an instruction to the portal device, wherein the instruction directs the portal device to change from the locked state to an unlocked state.

9. The article of manufacture of claim 8, wherein the wireless service provider system is associated with a cellular wireless service provider serving the client device, and wherein the service-provider-based identity is a cellular phone number of the client device.

10. The article of manufacture of claim 8, wherein the computing system has access to a database associating anonymized identities with respective capabilities, and wherein verifying that unlocking the portal device is within the authorized capabilities of the anonymized identity comprises:
looking up the anonymized identity in the database to determine associated capabilities; and
determining that the associated capabilities indicate that the anonymized identity is permitted to cause the portal device to change from the locked state to the unlocked state.

11. The article of manufacture of claim 8, wherein the anonymized identity is also based on one or more of an entity, a location, or a type of transaction provided by the portal device.

12. The article of manufacture of claim 8, wherein transmitting the instruction to the portal device comprises transmitting the instruction to a machine control device that controls the portal device, wherein the machine control device causes the portal to change from the locked state to the unlocked state.

13. The article of manufacture of claim 8, wherein the instruction is also based on the anonymized identity.

14. A computing system comprising:
  at least one processor;
  memory; and
  program instructions, stored in the memory, that upon execution by the at least one processor cause the computing system to perform operations comprising:
    receiving a message from a wireless service provider system, wherein the message contains a service-provider-based identity of a client device, an indication that the service-provider-based identity has been authenticated by the wireless service provider, and a single code that the client device obtained from a portal device proximate to the client device, wherein the portal device is in a locked state, and wherein the code includes a first sub-code that identifies the portal device and a second sub-code that identifies a task of unlocking the portal device;
    generating an anonymized identity of the client device based on the service-provider-based identity, wherein the anonymized identity is generated by applying a one-way function to the service-provider-based identity and the code, wherein the computing system is configured to generate different anonymized identities for the client device based on respective codes that the client device receives from respective remote machines, and wherein the portal device is one of the remote machines;
    based on the code and the anonymized identity, verifying that unlocking the portal device is within the authorized capabilities of the anonymized identity; and
    transmitting an instruction to the portal device, wherein the instruction directs the portal device to change from the locked state to an unlocked state.

15. The computing system of claim 14, wherein the wireless service provider system is associated with a cellular wireless service provider serving the client device, and wherein the service-provider-based identity is a cellular phone number of the client device.

16. The computing system of claim 14, wherein the anonymized identity is also based on one or more of an entity, a location, or a type of transaction provided by the portal device.

17. The computing system of claim 14, wherein transmitting the instruction to the portal device comprises transmitting the instruction to a machine control device that controls the portal device, wherein the machine control device causes the portal to change from the locked state to the unlocked state.

18. The computing system of claim 14, wherein the instruction is also based on the anonymized identity.

* * * * *